US009137305B2

(12) United States Patent
Nishi

(10) Patent No.: US 9,137,305 B2
(45) Date of Patent: Sep. 15, 2015

(54) INFORMATION PROCESSING DEVICE, COMPUTER-READABLE RECORDING MEDIUM, AND CONTROL METHOD

(75) Inventor: Tetsuya Nishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 13/564,017

(22) Filed: Aug. 1, 2012

(65) Prior Publication Data

US 2013/0054828 A1 Feb. 28, 2013

(30) Foreign Application Priority Data

Aug. 31, 2011 (JP) .................................. 2011-188169

(51) Int. Cl.
G06F 15/177 (2006.01)
G06F 15/173 (2006.01)
H04L 29/08 (2006.01)
H04L 12/26 (2006.01)
G06F 11/30 (2006.01)
H04L 12/24 (2006.01)

(52) U.S. Cl.
CPC ........ H04L 67/1034 (2013.01); H04L 67/1025 (2013.01); G06F 11/30 (2013.01); H04L 41/0668 (2013.01); H04L 43/026 (2013.01); H04L 43/10 (2013.01); H04L 43/50 (2013.01); H04L 67/1012 (2013.01)

(58) Field of Classification Search
CPC ............ H04L 67/1025; H04L 67/1034; H04L 67/1095; H04L 45/28; H04L 41/0668; H04L 67/1012; H04L 43/026; H04L 43/50; H04L 43/10; H04W 36/00; H04W 76/046; G06F 11/07; G06F 11/30
See application file for complete search history.

(56) References Cited

U.S. PATENT DOCUMENTS

| 5,960,005 | A  | * | 9/1999  | Moteki et al. ................. 370/496 |
| 6,188,689 | B1 | * | 2/2001  | Katsube et al. ............... 370/389 |
| 6,321,266 | B1 | * | 11/2001 | Yokomizo et al. ............ 709/226 |
| 6,912,223 | B1 | * | 6/2005  | Sloane .......................... 370/401 |
| 6,980,555 | B2 | * | 12/2005 | Mar ......................... 370/395.21 |
| 6,993,023 | B2 | * | 1/2006  | Foster et al. .................. 370/389 |

(Continued)

FOREIGN PATENT DOCUMENTS

| JP | 2006-332825 | 12/2006 |
| JP | 2008-92465  | 4/2008  |
| JP | 2009-246957 | 10/2009 |

OTHER PUBLICATIONS

Office Action issued by the Japanese Patent Office on Feb. 17, 2015 in the corresponding Japanese patent application No. 2011-188169.

Primary Examiner — Lynn Feild
Assistant Examiner — Michael A Chambers
(74) Attorney, Agent, or Firm — Staas & Halsey LLP

(57) ABSTRACT

An information processing device includes a processor to execute a process including: blocking, owing to remote control through a network, at least one of communication of a request transmitted by a first device and addressed to a second device, the communication being performed from a network device, disposed on a communication path between the first device and the second device, to the second device, and communication of a response transmitted by the second device and addressed to the first device; acquiring, from the network device, the request transmitted by the first device and addressed to the second device; and transmitting to the first device, an instruction for switching a transmission destination of the request to a third device.

20 Claims, 33 Drawing Sheets

(56) References Cited

U.S. PATENT DOCUMENTS

| | | | |
|---|---|---|---|
| 7,000,021 B1* | 2/2006 | Radhakrishnan et al. | 709/230 |
| 7,042,877 B2* | 5/2006 | Foster et al. | 370/389 |
| 7,111,162 B1* | 9/2006 | Bagepalli et al. | 713/151 |
| 7,152,114 B2* | 12/2006 | Yasaki et al. | 709/238 |
| 7,164,656 B2* | 1/2007 | Foster et al. | 370/235 |
| 7,447,800 B2* | 11/2008 | Kobayashi et al. | 709/242 |
| 7,472,200 B1* | 12/2008 | Taylor et al. | 709/238 |
| 7,526,549 B2* | 4/2009 | Block et al. | 709/225 |
| 7,603,451 B2* | 10/2009 | Matsumoto | 709/223 |
| 7,756,049 B2* | 7/2010 | Chen et al. | 370/252 |
| 7,804,823 B2* | 9/2010 | Toscano et al. | 370/356 |
| 7,903,651 B2* | 3/2011 | Kompella et al. | 370/389 |
| 7,957,383 B2* | 6/2011 | Kumazawa et al. | 370/392 |
| 7,991,400 B2* | 8/2011 | Ito et al. | 455/436 |
| 8,045,485 B2* | 10/2011 | Shima et al. | 370/255 |
| 8,064,385 B2* | 11/2011 | Kumazawa et al. | 370/328 |
| 8,332,506 B2* | 12/2012 | Sayama | 709/224 |
| 8,738,728 B2* | 5/2014 | Takeo | 709/217 |
| 2002/0091858 A1* | 7/2002 | Yasaki et al. | 709/238 |
| 2002/0099838 A1* | 7/2002 | Sebastian | 709/230 |
| 2002/0181395 A1* | 12/2002 | Foster et al. | 370/229 |
| 2003/0041140 A1* | 2/2003 | Matsumoto | 709/223 |
| 2003/0128681 A1* | 7/2003 | Rauschmayer | 370/338 |
| 2005/0033828 A1* | 2/2005 | Watanabe | 709/219 |
| 2006/0271700 A1 | 11/2006 | Kawai et al. | |
| 2007/0097880 A1* | 5/2007 | Rajsic | 370/254 |
| 2007/0201434 A1* | 8/2007 | Nakamura et al. | 370/352 |
| 2008/0084820 A1 | 4/2008 | Aoki et al. | |
| 2009/0201848 A1* | 8/2009 | Kumazawa et al. | 370/328 |
| 2009/0234943 A1* | 9/2009 | Gyo et al. | 709/224 |
| 2009/0264132 A1* | 10/2009 | Tajima et al. | 455/436 |
| 2009/0285206 A1* | 11/2009 | Kawauchi et al. | 370/389 |
| 2011/0072103 A1* | 3/2011 | Goto | 709/208 |
| 2011/0141879 A1* | 6/2011 | Ballard | 370/217 |
| 2014/0133830 A1* | 5/2014 | Mahan | 386/261 |

* cited by examiner

FIG. 9

| TRANSMISSION SOURCE IP ADDRESS | DESTINATION IP ADDRESS | NUMBER OF TRANSMITTED PACKETS | NUMBER OF RECEIVED PACKETS | NUMBER OF TRANSMITTING SIDE LOST PACKETS | NUMBER OF RECEIVING SIDE LOST PACKETS | QUALITY ANALYSIS RESULT |
|---|---|---|---|---|---|---|
| 192.168.1.10 | 192.168.100.5 | 10000 | 10000 | 100 | 100 | × |
| 192.168.1.15 | 192.168.100.5 | 9000 | 9000 | 100 | 100 | × |
| 192.168.1.20 | 192.168.100.5 | 10500 | 10500 | 110 | 110 | × |
| 192.168.1.25 | 192.168.100.5 | 11000 | 11000 | 120 | 120 | ○ |
| 192.168.10.10 | 192.168.100.5 | 10000 | 10000 | 0 | 0 | ○ |
| 192.168.10.15 | 192.168.100.5 | 9000 | 9000 | 0 | 0 | ○ |
| 192.168.10.20 | 192.168.100.5 | 10500 | 10500 | 0 | 0 | ○ |
| 192.168.10.25 | 192.168.100.5 | 11000 | 11000 | 0 | 0 | ○ |

```
GET / HTTP/1.1
Accept: image/gif, image/jpeg, */*
Accept-Language: ja
Accept-Encoding: gzip, deflate
User-Agent: Mozilla/4.0 (Compatible; MSIE 6.0;
Windows NT 5.1;)
Host: www.xxx.zzz
Connection: Keep-Alive
             ⋮
```

```
HTTP/1.1 200 OK
Date: Thu, 20 Mar 2003 11:03:45 GMT
Server: Apache
Last-Modified: Mon, 10 Mar 2003 05:58:20 GMT
Connection: close
Content-Type: text/html; charset=shift_jis
                    ⋮
```

HTTP/1.1 301 Moved Permanently
Date:?Sun, 17 May 2009 10:47:41
GMT?Server:?Apache
Location: http://www.yyy.xxx/
Connection: close
Transfer-Encoding: chunked
Content-Type: text/html; charset=iso-8859-1

⋮

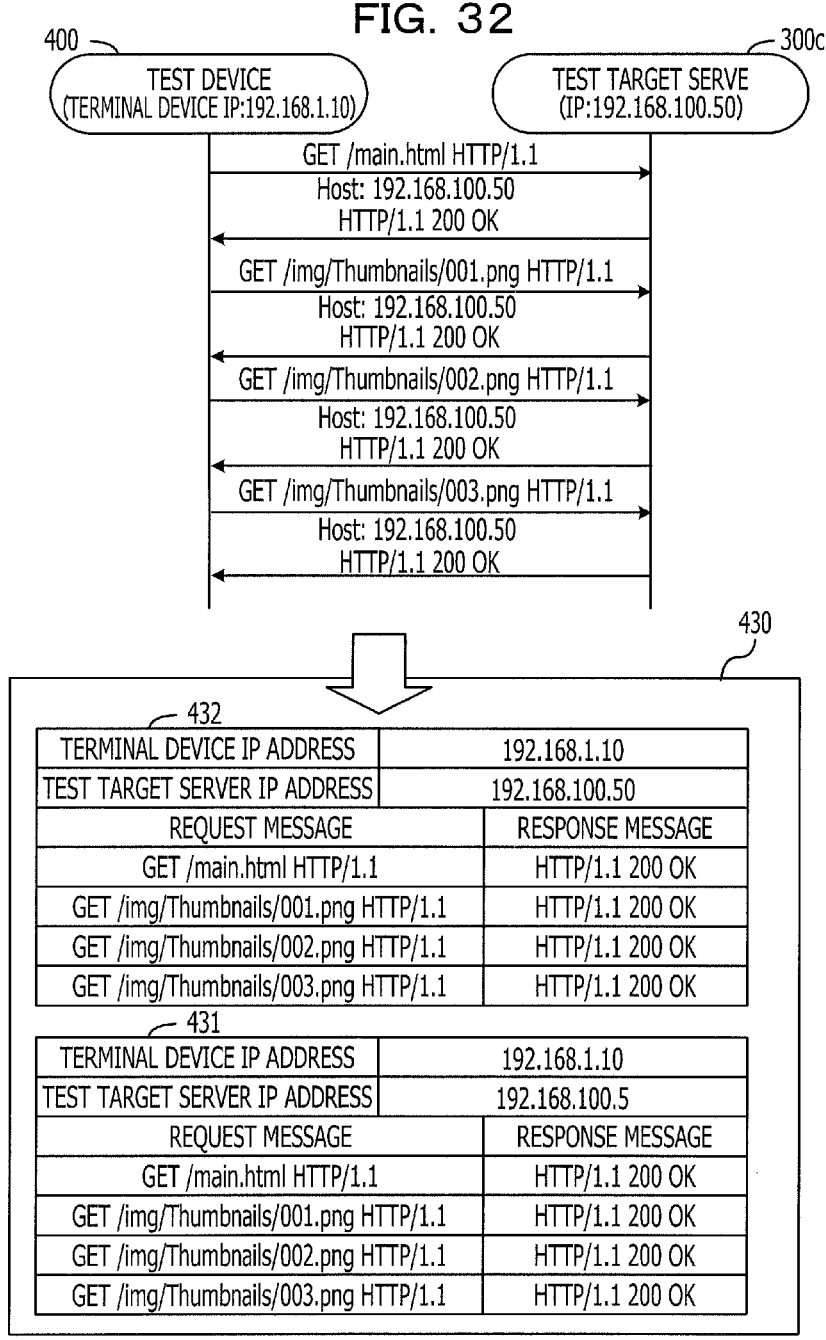

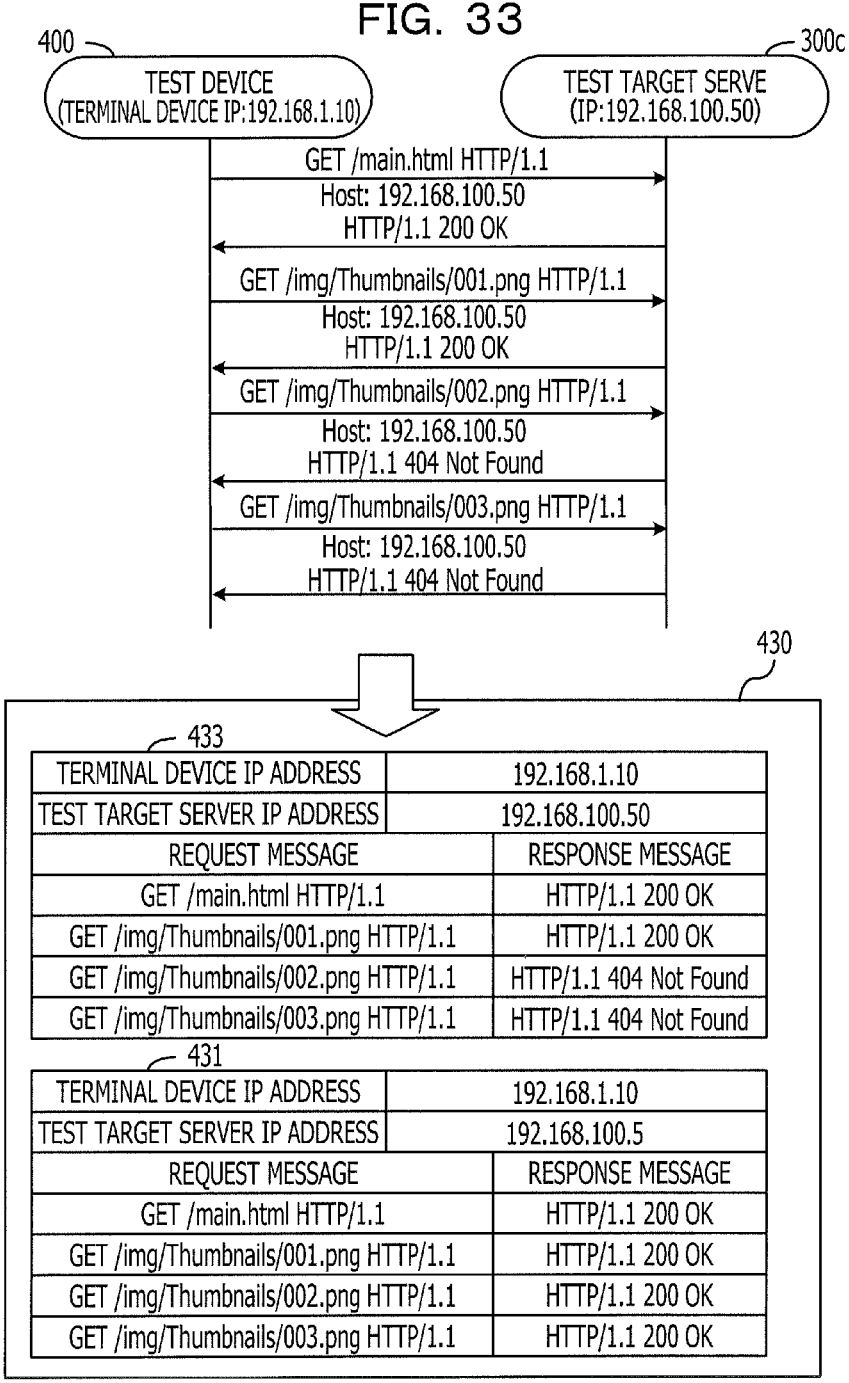

INFORMATION PROCESSING DEVICE, COMPUTER-READABLE RECORDING MEDIUM, AND CONTROL METHOD

CROSS-REFERENCE TO RELATED APPLICATION(S)

This application is based upon and claims the benefit of priority of the prior Japanese Patent Application No. 2011-188169, filed on Aug. 31, 2011, the entire contents of which are incorporated herein by reference.

FIELD

The embodiments discussed herein are related to an information processing device, a program, and a control method, which perform control of switching an access destination.

BACKGROUND

In a plurality of data centers deployed through a wide area and a network connecting those data centers, a case occasionally occurs where a load on a network or a server within a data center increases and a response from the server to a terminal device used by a user is delayed. In such a case, it is important to swiftly switch an access destination of the terminal device to another server or another data center and improve a response to the terminal device.

For example, as a technique for causing an access destination to be switched with respect to the terminal device, a technique has been considered where, in a load balancer, a data center is preferentially selected as the recommended center of a client, the data center being capable of providing service to the client with a small delay time. In this technique, in reply to a request from the client, the load balancer responds with a redirect message instructing to re-access the recommended center and hence, causes the client to access the recommended center.

As related art, for example, Japanese Laid-open Patent Publication No. 2006-332825 or the like has been disclosed.

SUMMARY

According to an aspect of the invention, an apparatus includes a processor to execute a process including: blocking, owing to remote control through a network, at least one of communication of a request transmitted by a first device and addressed to a second device, the communication being performed from a network device, disposed on a communication path between the first device and the second device, to the second device, and communication of a response transmitted by the second device and addressed to the first device; acquiring, from the network device, the request transmitted by the first device and addressed to the second device; and transmitting to the first device, an instruction for switching a transmission destination of the request to a third device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a data structure of a quality information storage unit;

FIG. 16 is a diagram illustrating an example of a request message;

FIG. 17 is a diagram illustrating an example of a response message;

FIG. 18 is a diagram illustrating an example of a redirect message;

FIG. 32 is a diagram illustrating an example of communication when a test target server correctly functions; and FIG. 33 is a diagram illustrating an example of communication when a test target server does not correctly function.

DESCRIPTION OF EMBODIMENTS

Hereinafter, the present embodiments will be described with reference to drawings. In addition, it is possible to implement the individual embodiments with a plurality of embodiments being combined in a consistent scope.

Figure 1:
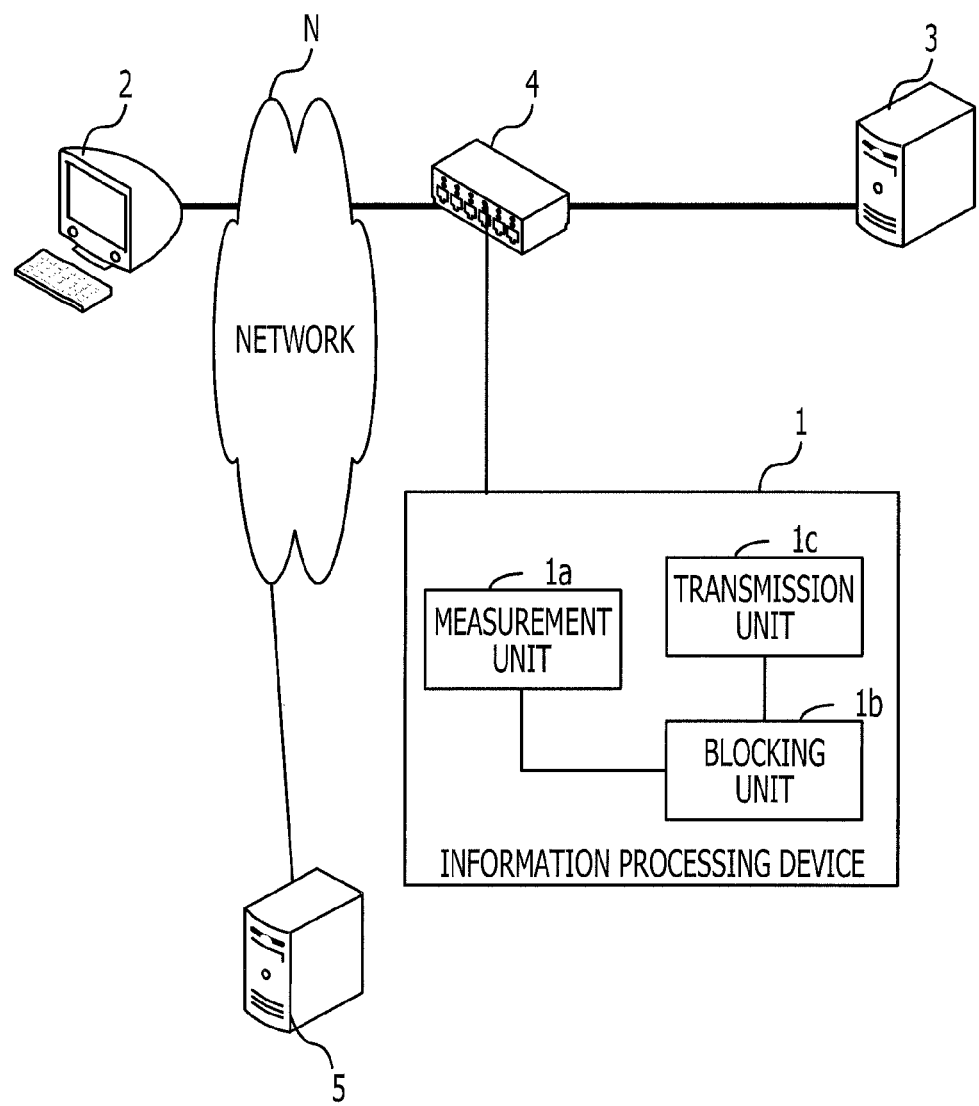
FIG. 1 is a block diagram illustrating an example of a function configuration of a device according to a first embodiment.

FIG. 1 is a block diagram illustrating an example of the function configuration of a device according to a first embodiment. A first device 2, a second device 3, and a third device 5 are connected to a network N. The second device 3 is connected to the network N through a network device 4. It is possible for the second device 3 and the third device 5 to execute processing in response to a request from the first device 2 and respond with a processing result.

An information processing device 1 is connected to the network device 4. For example, the network device 4 is a network switch (hereinafter, simply referred to as a "switch") including a mirror port. When the network device 4 is a switch, the information processing device 1 is connected to the mirror port and a normal communication port of the network device 4, for example. In this case, for example, the information processing device 1 acquires a request or a response between the first device 2 and the second device 3 through the mirror port, and performs control of blocking communication relating to a request or a response between the first device 2 and the second device 3, through the normal communication port.

The information processing device 1 includes a measurement unit 1a, a blocking unit 1b, and a transmission unit 1c.

The measurement unit is measures communication quality between the second device 3 and each of a plurality of devices transmitting requests to the second device 3. In addition, the measurement unit is determines, as the first device 2, a device where the communication quality has become less than or equal to a given value. For example, the measurement unit is acquires, from the network device 4, communication between the second device 3 and another device, analyzes the acquired communication, and judges a device where the communication quality has become less than or equal to the given value. The measurement unit is may also determine, as the first device 2, each device belonging to the same subnet as that of the device where the communication quality has become less than or equal to the given value. Furthermore, the measurement unit is may also determine, as the first device 2, a device having a past communication performance with respect to the second device 3, from among devices belonging to the same subnet as that of the device where the communication quality has become less than or equal to the given value.

Owing to remote control through the network, the blocking unit 1b blocks at least one of communication of a request transmitted by the first device 2 and addressed to the second device 3, the communication being performed from the network device 4 to the second device 3, and communication of a response transmitted by the second device 3 and addressed to the first device 2. For example, the blocking unit 1b blocks communication after a given time period or more has elapsed from a time when final communication was established between the first device 2 and the second device 3.

For example, the communication blocking is executed as follows.

For example, the blocking unit 1b transmits, to the second device 3, an instruction for registering, as the destination address of a frame in a data link layer when a packet addressed to the first device 2 is transmitted, an address different from the address of a device on a communication path between the first device 2 and the second device 3. When such an address has been registered, a response from the second device 3 to the first device 2 is received by a device other than the communication path between the first device 2 and the second device 3 and discarded in the device or alternatively, is discarded with no existence of a device receiving the response.

For example, it may also be possible for the blocking unit 1b to transmit, to the network device 4, an instruction for blocking communication of a request transmitted by the first device 2 and addressed to the second device 3. In this case, for example, the blocking unit 1b acquires, from the network device 4, the request transmitted by the first device 2 and addressed to the second device 3, and if the given time period or more has not elapsed from a time when the last communication was established between the first device 2 and the second device 3, the blocking unit 1b transfers the request to the second device 3. In addition, when having received the request transmitted by the first device 2 and addressed to the second device 3 after the given time period or more elapsed from a time when the last communication had been established between the first device 2 and the second device 3, the transmission unit 1c transmits, to the first device 2, an instruction for switching the transmission destination of the request to the third device 5. When such a blocking instruction has been performed, the blocking unit 1b transmits, to the network device 4, an instruction for cancelling blocking of communication transmitted by the first device 2 and addressed to the second device 3 after the transmission unit is has transmitted the switching instruction to the first device 2, for example.

The blocking unit 1b may also block communication by operating, with respect to a router connected in the same segment as the second device 3, the destination address of a frame in a data link layer when a packet addressed to the second device 3 is transmitted. For example, the blocking unit 1b transmits an instruction for registering an address different from the address of a device on the communication path between the first device 2 and the second device 3, as the destination address of a frame in a data link layer when a packet addressed to the second device 3 is transmitted. After such an address was registered, when a request from the first device to the second device has been transferred from the router, the request is received by a device other than the communication path between the first device 2 and the second device 3 and discarded in the device or alternatively, the request is discarded with no existence of a device receiving the request.

The transmission unit is acquires, from the network device 4, the request transmitted by the first device 2 and addressed to the second device 3. In addition, the transmission unit 1c transmits, to the first device 2, an instruction for switching the transmission destination of the request to the third device 5. For example, the transmission unit is acquires the request transmitted by the first device 2 and addressed to the second device 3 after communication has been blocked by the blocking unit 1b, and transmits the instruction for switching the transmission destination of the request to the third device 5.

The measurement unit 1a, the blocking unit 1b, and the transmission unit is may be realized using a processor such as a central processing unit (CPU) or the like, included in the information processing device 1.

Lines establishing connections between the individual elements illustrated in FIG. 1 illustrate a portion of the communication path, and a communication path other than the illustrated communication path may also be set.

Figure 2:
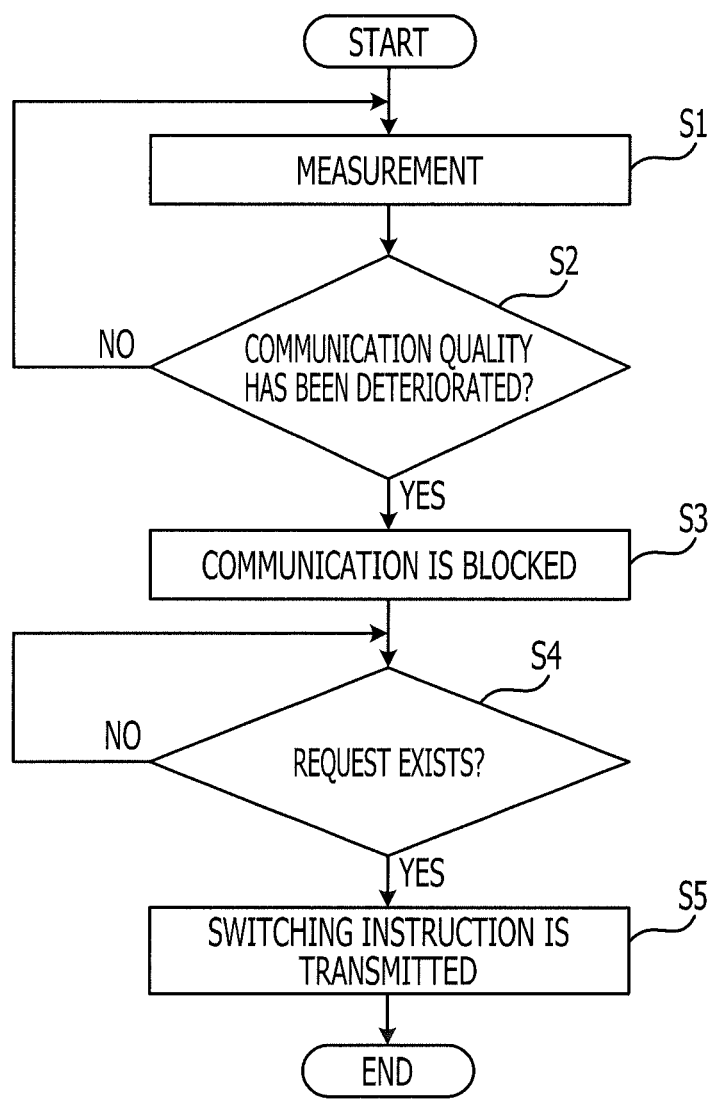
FIG. 2 is a flowchart illustrating an example of a processing procedure of an information processing device according to the first embodiment.

FIG. 2 is a flowchart illustrating an example of the processing procedure of an information processing device according to the first embodiment. Hereinafter, processing illustrated in FIG. 2 will be described along step numbers.

[S1] The measurement unit is measures communication quality between the first device 2 and the second device 3.

[S2] The measurement unit is determines whether or not the communication quality between the first device 2 and the second device 3 has been deteriorated to be less than or equal to a given value. When the communication quality has been deteriorated to be less than or equal to the given value, the measurement unit is causes the processing to proceed to S3. When the communication quality has not been deteriorated to be less than or equal to the given value, the measurement unit is causes the processing to proceed to S1.

[S3] From among communications between the first device 2 and the second device 3, the blocking unit 1b blocks the communication of a request from the network device 4 to the second device 3 or the transmission of a response from the second device 3 to the first device 2.

[S4] The transmission unit is acquires, from the network device 4, the content of communication addressed to the second device 3, and determines whether or not a request transmitted from the first device 2 and addressed to the second device 3 has been detected. When the corresponding request has been detected, the transmission unit 1c causes the processing to proceed to S5. When the corresponding request has not been detected, the transmission unit is repeats the processing in S4.

[S5] The transmission unit 1c transmits, to the first device 2, an instruction for switching the transmission destination of the request to the third device 5.

Owing to such a procedure, the instruction for switching the transmission destination of the request is transmitted to the first device 2.

Figure 3:
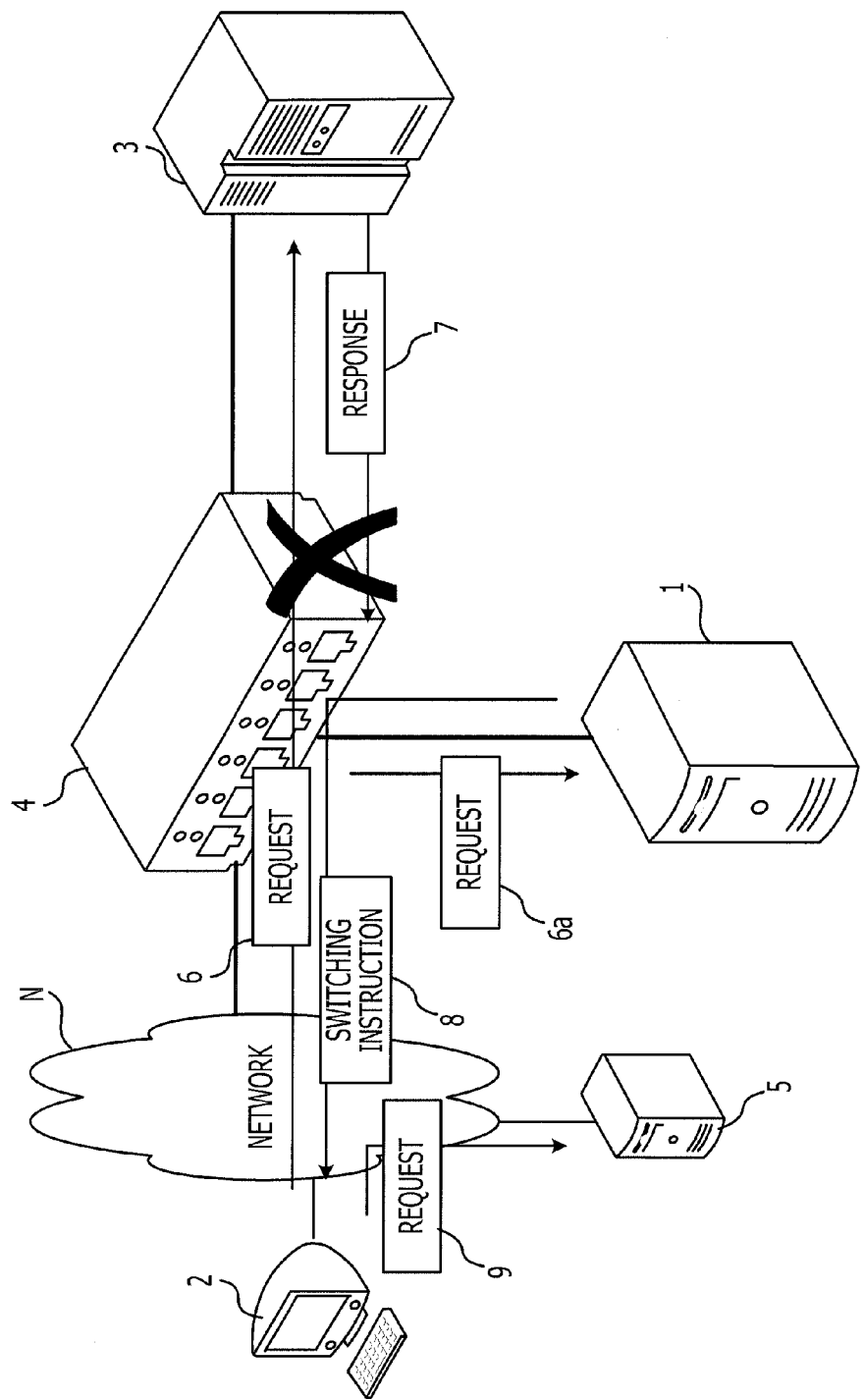
FIG. 3 is a diagram illustrating an example of control of switching an access destination, performed in the first embodiment.

FIG. 3 is a diagram illustrating an example of control of switching an access destination, performed in the first embodiment. FIG. 3 illustrates the situation of communication after processing for blocking communication, performed by the blocking unit 1b.

When a request 6 addressed to the second device 3 has been transmitted from the first device 2, the request 6 is normally transferred to the network device 4. Therefore, in the information processing device 1, it is possible to acquire, for example, a request 6a copied from the request 6, through the network device 4.

On the other hand, since the communication of the request 6 from the network device 4 to the second device 3 or the communication of a response 7 from the second device 3 to the first device 2 has been blocked, the response 7 from the second device 3 with respect to the request 6 does not reach the first device 2.

When having acquired the request 6a, the information processing device 1 transmits a switching instruction 8 to the first device 2. Therefore, in accordance with the switching instruction 8, the first device 2 transmits a request 9, which has the same content as the request 6 and is addressed to the third device 5.

In this way, according to the first embodiment, without providing a transmitting function for redirect, in a router, a load balancer, or the like, using a simple method, it is possible to perform control of switching an access destination in units of devices transmitting requests, at the time of the occurrence of the deterioration of communication quality. Furthermore, since control of switching a request transmission destination is performed from outside the communication path between the first device 2 and the second device 3, even if the information processing device 1 is installed, an influence on communication between devices other than a target of switching is suppressed.

Next, a second embodiment will be described. In the second embodiment, an access from a terminal device to a server within a data center is sorted into a server within another data center in response to a load status.

Figure 4:
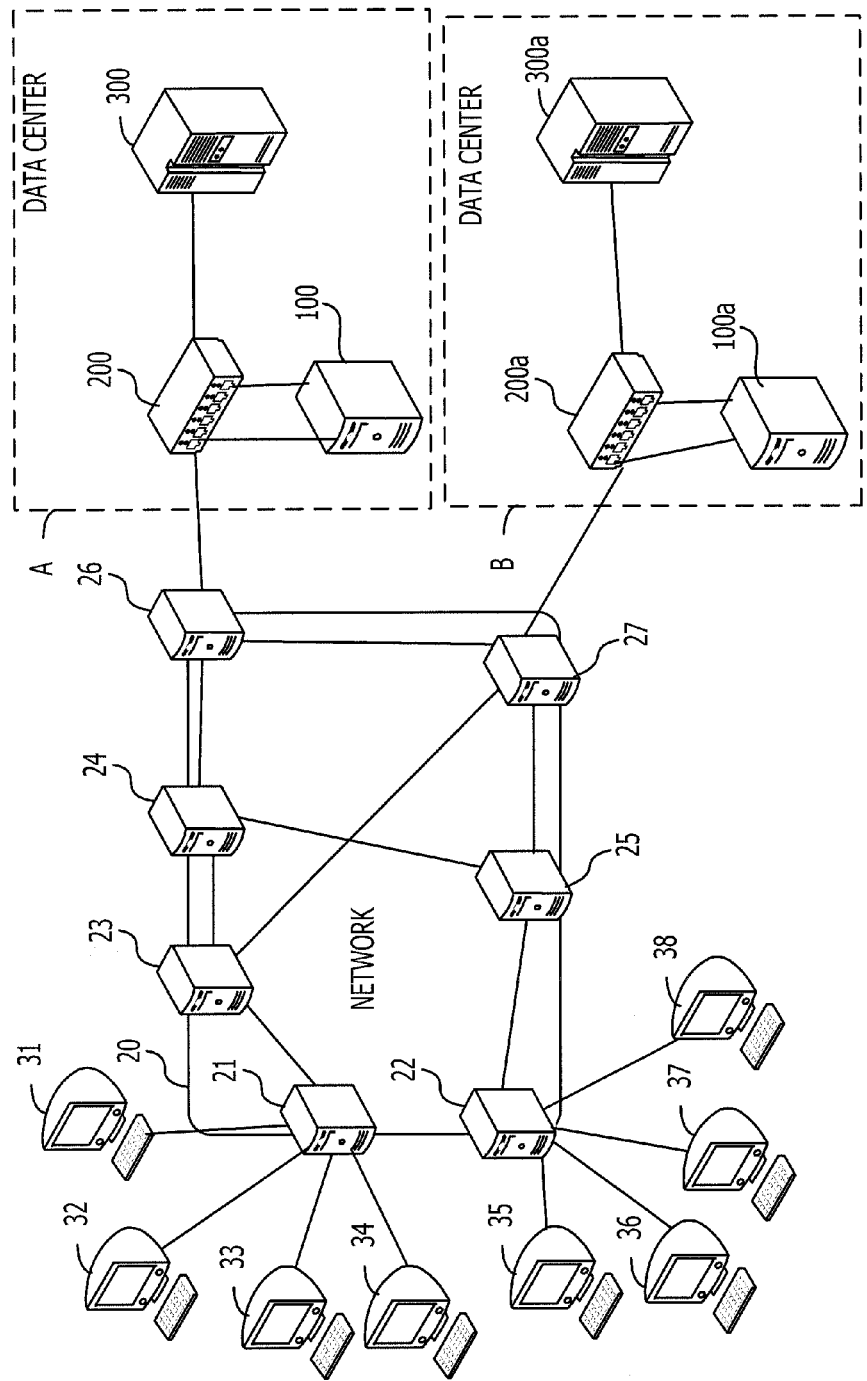
FIG. 4 is a diagram illustrating an example of a configuration of a system of a second embodiment.

FIG. 4 is a diagram illustrating an example of the configuration of a system of the second embodiment. As illustrated in FIG. 4, in the second embodiment, a plurality of data centers A and B are provided.

In the data center A, a server 300 is provided. The server 300 is connected to a network 20 through a switch 200. The server 300 executes processing in response to a request message sent from terminal devices 31 to 38, and responds with a response message.

A redirect device 100 is connected to the switch 200. The switch 200 and the redirect device 100 are connected to each other using two communication lines. One communication line is used for transmitting, from the switch 200 to the redirect device 100, a message addressed to the redirect device 100 and transmitting, from the redirect device 100 to the switch 200, a message transmitted by the redirect device 100. The other communication line is connected to the mirror port of the switch 200 and used for transferring the copy of a packet communicated between the network 20 and the switch 200. In response to the load status of the server 300, the redirect device 100 sorts the access destinations of the terminal devices 31 to 38 into another server 300a. For example, the redirect device 100 transmits a redirect message, which designates the server 300a as a redirect destination, to a terminal device serving as a target where the access destination is sorted into the other server 300a. The address of the transmission source of the redirect message is the address of the server 300.

In the same way as the data center A, a server 300a, a switch 200a, and a redirect device 100a are also provided in the data center B.

In the network 20, a packet is transferred owing to a plurality of routers 21 to 27. Terminal devices 31 to 34 are connected to the router 21. Terminal devices 35 to 38 are connected to the router 22.

The redirect device 100 illustrated in FIG. 4 is an example of the information processing device 1 of the first embodiment illustrated in FIG. 1. The terminal devices 31 to 38 illustrated in FIG. 4 are examples of the first device 2 of the first embodiment illustrated in FIG. 1. The server 300 illustrated in FIG. 4 is an example of the second device 3 of the first embodiment illustrated in FIG. 1. The server 300a illustrated in FIG. 4 is an example of the third device 5 of the first embodiment illustrated in FIG. 1. The switch 200 illustrated in FIG. 4 is an example of the network device 4 illustrated in FIG. 1.

Figure 5:
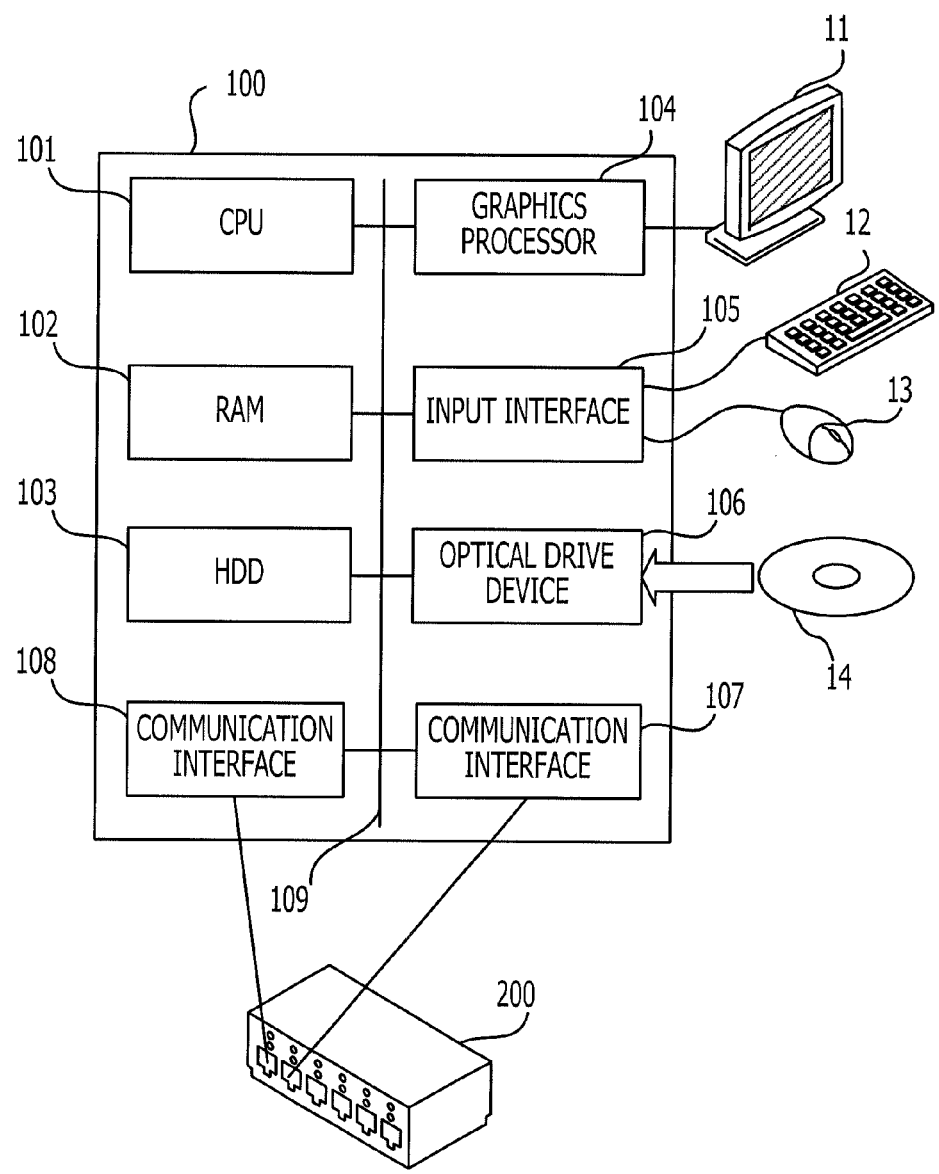
FIG. 5 is a diagram illustrating an example of a configuration of hardware of a redirect device used in the second embodiment.

FIG. 5 is a diagram illustrating an example of the configuration of the hardware of a redirect device used in the second embodiment. The whole device of the redirect device 100 is controlled by a CPU 101. A random access memory (RAM) 102 and a plurality of peripheral devices are electrically connected to the CPU 101 through a bus 109.

The RAM 102 is used as the main storage device of the redirect device 100. At least a portion of a program of an operating system (OS) or an application program caused to be executed by the CPU 101 is temporarily stored in the RAM 102. Various kinds of data desirable for processing due to the CPU 101 are stored in the RAM 102.

Examples of a peripheral device connected to the bus 109 include a hard disk drive (HDD) 103, a graphics processor 104, an input interface 105, an optical drive device 106, and communication interfaces 107 and 108. The communication interfaces 107 and 108 include a transmitter and a receiver, respectively.

The HDD 103 magnetically performs writing and reading of data on a built-in disk. The HDD 103 is used as the secondary storage device of the redirect device 100. The program of the OS, the application program, and the various kinds of data are stored in the HDD 103. As the secondary storage device, a semiconductor storage device such as a flash memory or the like may also be used.

A monitor 11 is connected to the graphics processor 104. In accordance with an instruction from the CPU 101, the graphics processor 104 causes an image to be displayed on the screen of the monitor 11. Examples of the monitor 11 include a display device utilizing a cathode ray tube (CRT), a liquid crystal display device, and the like.

A keyboard 12 and a mouse 13 are connected to the input interface 105. The input interface 105 transmits, to the CPU 101, a signal sent from the keyboard 12 or the mouse 13. In addition, the mouse 13 is an example of a pointing device, and another pointing device may also be used. Examples of the other pointing device include a touch panel, a tablet, a touchpad, a trackball, and the like.

Using laser light or the like, the optical drive device 106 performs reading of data recorded in the optical disk 14. The optical disk 14 is a portable recording medium where data is recorded so as to be readable owing to the reflection of light. Examples of the optical disk 14 include a digital versatile disc (DVD), a DVD-RAM, a compact disc read only memory (CD-ROM), a CD-recordable/rewritable (CD-R/RW), and the like.

The communication interface 107 is connected to the normal communication port of the switch 200. The communication interface 107 transmits and receives data to and from the server 300 or the terminal devices 31 to 38 through the switch 200.

The communication interface 108 is connected to the mirror port of the switch 200. Through the mirror port, the communication interface 108 receives a packet transferred in the switch 200. In addition, the communication interface 108 is set so as to receive a packet input from the switch 200 even if the destination of the packet is a device other than the redirect device 100. In this way, processing for intercepting all input packets independently of the destinations of the packets is called "capture".

Owing to such a hardware configuration as described above, it may be possible to realize the processing function of the present embodiment. In addition, while an example of the hardware configuration of the redirect device 100 has been illustrated in FIG. 5, it may also be possible to realize the redirect device 100a illustrated in FIG. 4, using the same hardware as that of the redirect device 100. It may also be possible to realize the servers 300 and 300a, the routers 21 to 27, and the terminal devices 31 to 38 using the same hardware as that of the redirect device 100. With respect to the servers 300 and 300a, the routers 21 to 27, and the terminal devices 31 to 38, the communication interface 108 may not exist that receives all packets independently of destinations. The routers 21 to 27 include a plurality of communication interfaces 107 used for transmitting and receiving data. It may also be possible to realize the information processing device 1 illustrated in FIG. 1, using the same hardware as that of the redirect device 100 illustrated in FIG. 5.

Figure 6:
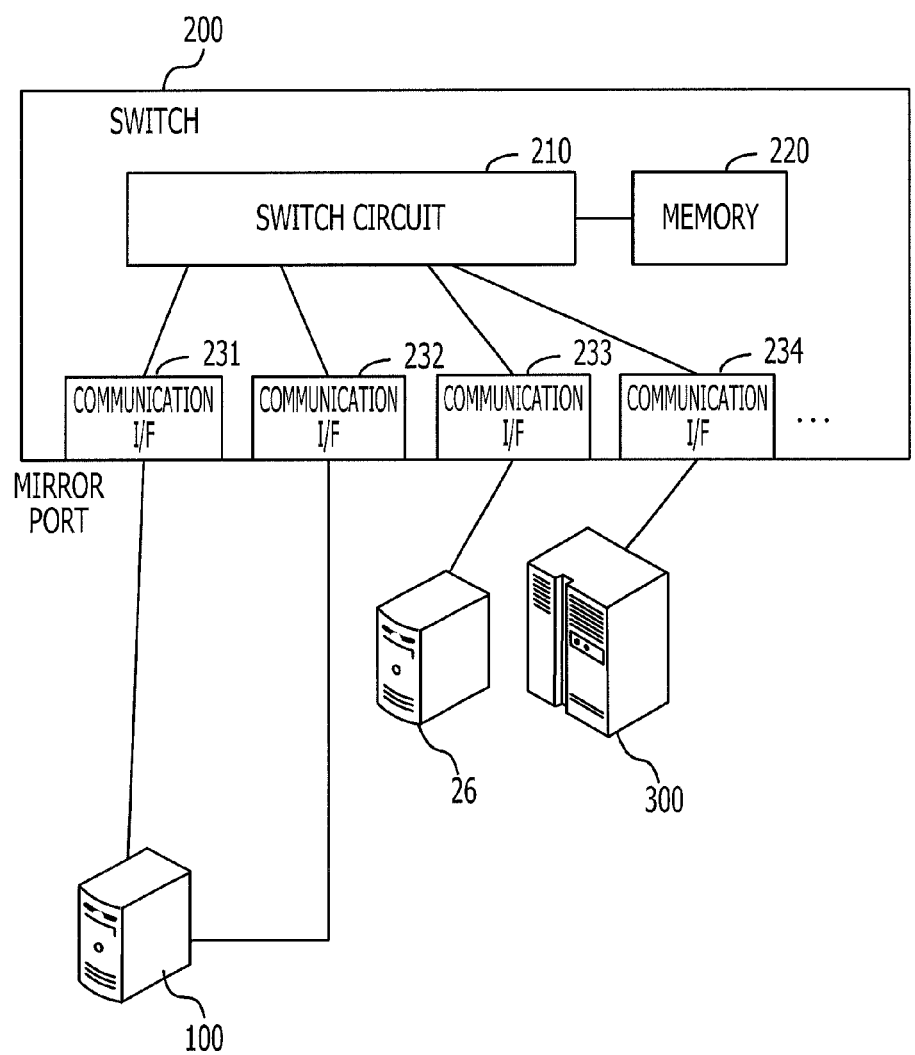
FIG. 6 is a diagram illustrating an example of a hardware configuration of a switch.

FIG. 6 is a diagram illustrating an example of the hardware configuration of a switch. The switch 200 includes a switch circuit 210, a memory 220, and a plurality of communication interfaces (I/Fs) 231, 232, 233, 234, . . . . Each of the plural communication I/Fs 231, 232, 233, 234, . . . includes a communication port connecting thereto a communication cable. In the example in FIG. 6, the communication port of the communication I/F 231 is used as a mirror port.

In the example in FIG. 6, the communication interface 108 in the redirect device 100 is connected to the communication I/F 231. The communication interface 107 in the redirect device 100 is connected to the communication I/F 232. A communication interface in the router 26 is connected to the communication I/F 233. A communication interface in the server 300 is connected to the communication I/F 234.

The switch circuit 210 transfers frames, input from the communication I/Fs 232, 233, 234, . . . , to the other communication I/Fs 232, 233, 234, . . . , in response to the destinations of the frames. The switch circuit 210 generates the copies of frames input to the communication I/Fs 232, 233, 234, . . . , and transmits the copies of frames through the communication I/F 231.

In the memory 220, a data table and the like are stored. In the data table, an output port corresponding to the destination of an input frame in a data link layer (the second layer of an Open Systems Interconnection (OSI) reference model) is registered. An Access Control List (ACL) is stored in the memory 220. The ACL is information for defining, in units of communication ports, a packet where communication through the communication port is allowed or not allowed.

It may also be possible to realize the switch 200a illustrated in FIG. 4, using the same hardware as that of the switch 200.

Figure 7:
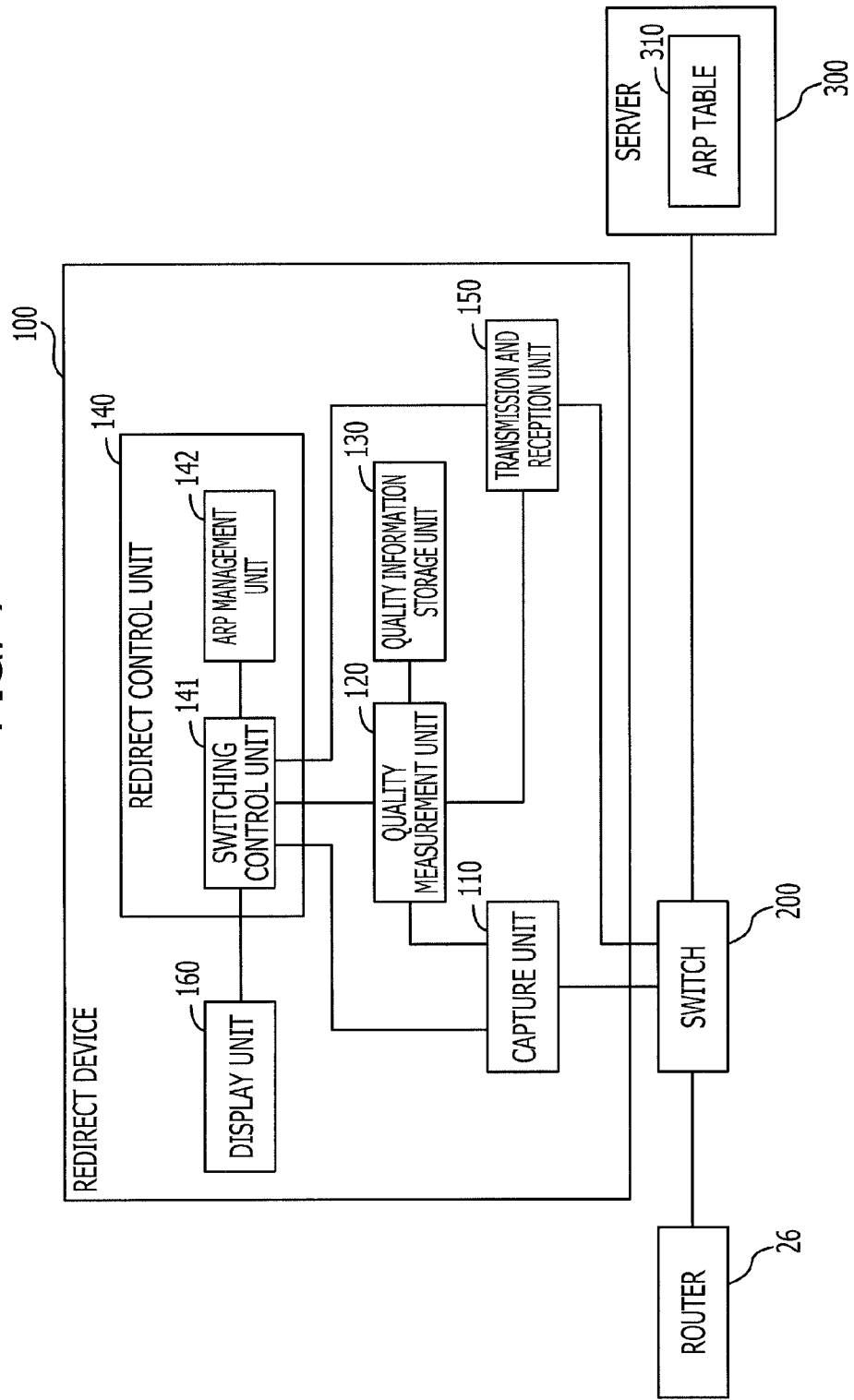
FIG. 7 is a block diagram illustrating an example of a function of the redirect device.

FIG. 7 is a block diagram illustrating an example of the function of a redirect device. The redirect device 100 includes a capture unit 110, a quality measurement unit 120, a quality information storage unit 130, a redirect control unit 140, a transmission and reception unit 150, and a display unit 160.

The capture unit 110 receives (captures) a packet output from the mirror port of the switch 200. The capture unit 110 transfers the captured packet to the quality measurement unit 120 and the redirect control unit 140.

The quality measurement unit 120 classifies a packet, received in the capture unit 110 or the transmission and reception unit 150, into a traffic flow with respect to each incoming or outgoing Internet Protocol (IP) address. For example, the quality measurement unit 120 extracts the transmission source IP address and the destination IP address of each packet, and generates a pair of the IP addresses. In addition, the quality measurement unit 120 arranges, in chronological order, packets sharing a pair of IP addresses in common and defines the packets as a traffic flow. In the generated traffic flow, in chronological order, packets are arranged that configure each of a request message and a response message between the server 300 and any one of the terminal devices. The quality measurement unit 120 measures the quality of each traffic flow. For example, the quality measurement unit 120 counts the number of lost packets with respect to each traffic flow. The number of lost packets indicates that the quality of communication is deteriorated with an increase in the number of lost packets. For example, by examining the ID field of an IP packet or the missing sequence number of a Transmission Control Protocol (TCP) packet, it may be possible to count the number of lost packets. In the case of User Datagram Protocol (UDP), by examining the missing sequence number of a Real-time Transport Protocol (RTP) packet, it may be possible to count the number of lost packets. On the basis of the measurement result of quality, with respect to each traffic flow (each pair of a transmission source and a destination), the quality measurement unit 120 determines the normality of quality. For example, when the ratio of lost packets to the number of transmitted or received packets is less than a given value, the quality measurement unit 120 determines that communication quality is good. In addition, when the ratio of lost packets to the number of transmitted or received packets is greater than or equal to a given value, the quality measurement unit 120 determines that communication quality is poor.

The quality measurement unit 120 stores the measurement result and the normality determination result of quality in the quality information storage unit 130. On the basis of the IP address of a terminal device serving as the transmission source of a request message in a traffic flow whose communication quality has been determined to be poor, the quality measurement unit 120 identifies a terminal device of a target of switching. In addition, the quality measurement unit 120 notifies a switching control unit 141 in the redirect control unit 140 of the IP address of the terminal device of a target of switching.

For example, when, in a same subnet, the number of terminal devices where quality is deteriorated is greater than or equal to a given number, the quality measurement unit 120 defines the whole subnet as a target of switching. When, from among terminal devices having communication performances in a same subnet, the ratio of terminal devices where quality is deteriorated is greater than or equal to a given value, the quality measurement unit 120 defines the whole subnet as a target of switching. When having defined the whole subnet as a target of switching, the quality measurement unit 120 identifies, for example, the IP address of a terminal device that has a past communication performance and is located within the subnet, and defines the terminal device as a target of switching.

For example, it may be possible to determine the presence or absence of the past communication performance by referring to the quality information storage unit 130. The information of the communication quality of a terminal device establishing communication in the past is registered in the quality information storage unit 130. Therefore, for example, from among the IP addresses of terminal devices whose information of communication quality is registered in the quality information storage unit 130, the quality measurement unit 120 extracts, as a target of switching, an IP address within the subnet of a target of switching. The quality measurement unit 120 may also store, as a communication history, a traffic flow generated for quality measurement, in the RAM 102 or the like, the traffic flow corresponding to a given time period in the past, and may also determine the presence or absence of the communication performance of each terminal device by referring to the stored traffic flow. When the number of terminal devices where quality is deteriorated is less than a given number, the quality measurement unit 120 identifies, as a target of switching, a terminal device where quality is deteriorated.

The quality information storage unit 130 stores therein the measurement result and the normality determination result of quality. For example, a portion of the storage area of the RAM 102 or the HDD 103 is used as the quality information storage unit 130.

The redirect control unit 140 controls the transmission of a redirect message causing a terminal device, whose communication quality is poor, to transmit a request message to the server 300*a* different from the server 300. For the sake of the transmission control of a redirect message, the redirect control unit 140 includes a switching control unit 141 and an Address Resolution Protocol (ARP) management unit 142.

On the basis of the IP address of a terminal device of a target of switching, given notice of by the quality measurement unit 120, the switching control unit 141 controls switching of the access destination of the terminal device of a target of switching. For example, the switching control unit 141 collects and registers the ARP table 310 of the server 300, in the ARP management unit 142. Here, the switching control unit 141 compares the IP address of a terminal device identified as a target of switching with the entry of an IP address registered in the ARP management unit 142. In addition, with respect to the IP address registered in the ARP management unit 142 even if the IP address is the IP address of a target of switching, the switching control unit 141 determines a state of establishing communication, and temporarily suspends processing for switching a request transmission destination. Namely, an entry is registered in the ARP table 310 for as long as the order of several minutes (for example, five minutes). Therefore, an IP address remaining in the ARP table is the IP address of a terminal device having transmitted a request within minutes. Therefore, in the second embodiment, the IP address remaining in the ARP table is regarded as being in a state of establishing communication, and the processing for switching the transmission destination of a request message is suspended.

From among the IP addresses of targets of switching, the switching control unit 141 registers an IP address, not registered in the ARP management unit 142, in the ARP table 310 in the server 300 with associating the IP address with the Media Access Control (MAC) address of the redirect device 100. In addition, when a request message has been input whose transmission source is an IP address not registered in the ARP management unit 142, from among the IP addresses of targets of switching, the switching control unit 141 generates a redirect message as a response corresponding to the request message. The generated redirect message instructs to be redirected to the server 300*a*. The switching control unit 141 transmits the generated redirect message through the transmission and reception unit 150.

The ARP management unit 142 stores therein the ARP table collected by the switching control unit 141. For example, a portion of the storage area of the RAM 102 or the HDD 103 is used as the ARP management unit 142.

The transmission and reception unit 150 is connected to a communication port other than the mirror port of the switch 200, and establishes communication with other devices such as the terminal devices 31 to 38, the server 300, and the like. For example, the transmission and reception unit 150 transmits redirect messages to the terminal devices 31 to 38. For the sake of collecting the ARP table 310 of the server 300 and performing setting, the transmission and reception unit 150 transmits a command message of a Simple Network Management Protocol (SNMP) to the server 300. The transmission and reception unit 150 discards a response message from the server 300, transferred to the redirect device 100.

The display unit 160 displays the IP address of a target of switching or the completion of switching, through the monitor 11.

These elements execute individual processing operations, and hence, it is possible to transmit a redirect message to each terminal device of a target of switching without influencing a terminal device in a state of establishing communication. As a result, without adding a router, a load balancer, or the like, it is possible to perform load balancing control by only connecting a simple device to the switch 200.

In addition, a line establishing a connection between individual elements illustrated in FIG. 7 indicates a portion of a communication path, and a communication path other than the illustrated communication path may also be set.

The quality measurement unit 120 illustrated in FIG. 7 includes the function of the measurement unit is in the information processing device 1 illustrated in the first embodiment. The switching control unit 141 illustrated in FIG. 7 includes the functions of the blocking unit 1b and the transmission unit 1c in the information processing device 1 illustrated in the first embodiment.

Incidentally, the IP address or the MAC address of each device is used for redirect control performed in the redirect device 100.

Figure 8:
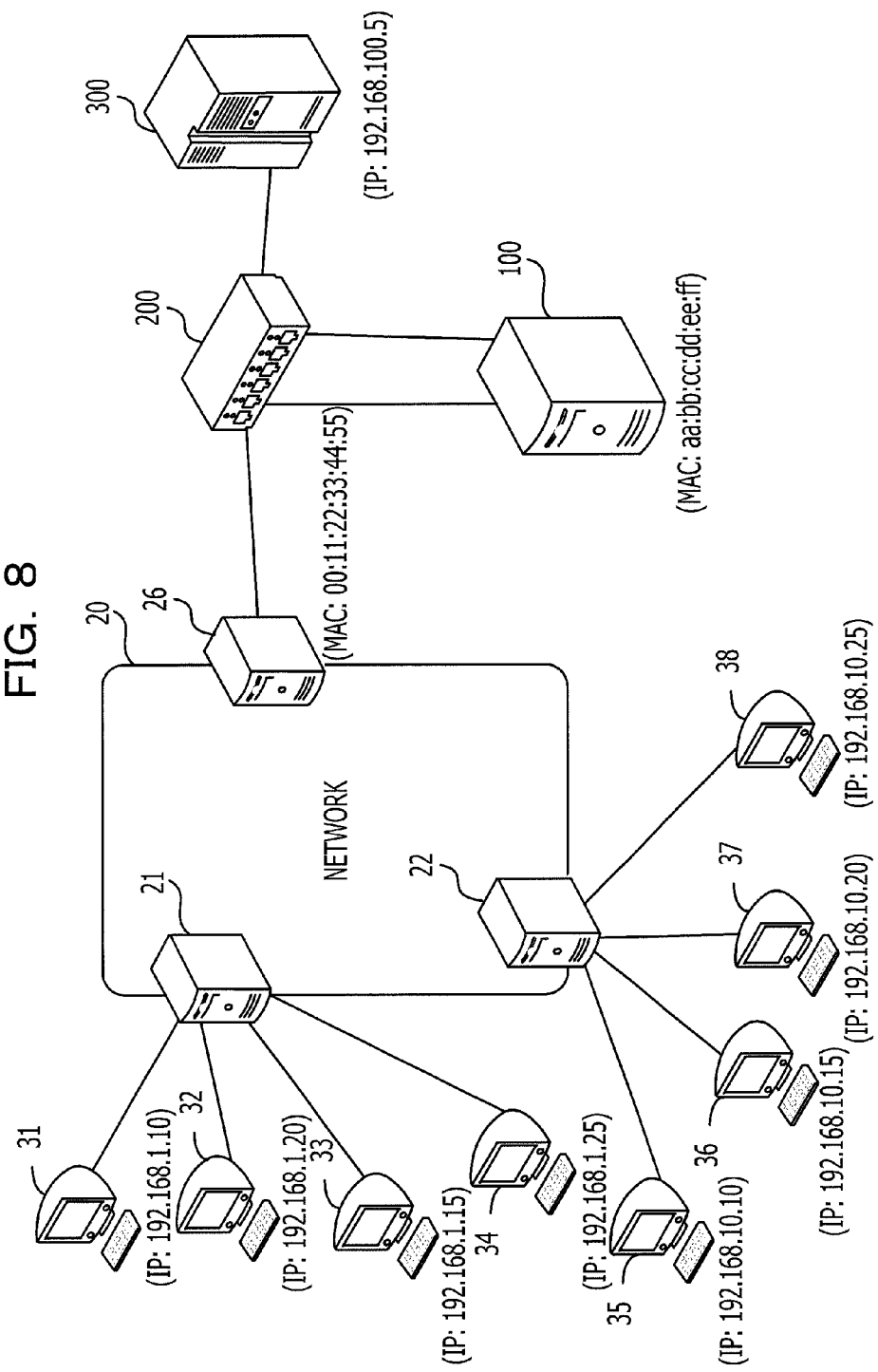
FIG. 8 is a diagram illustrating an example of an IP address or a MAC address of each device.

FIG. 8 is a diagram illustrating an example of the IP address or the MAC address of each device. In the example in FIG. 8, the IP address of the terminal device 31 is "192.168.1.10". The IP address of the terminal device 32 is "192.168.1.20". The IP address of the terminal device 33 is "192.168.1.15". The IP address of the terminal device 34 is "192.168.1.25". The IP address of the terminal device 35 is "192.168.10.10". The IP address of the terminal device 36 is "192.168.10.15". The IP address of the terminal device 37 is "192.168.10.20". The IP address of the terminal device 38 is "192.168.10.25". The IP address of the server 300 is "192.168.100.5".

The MAC address of the redirect device 100 is "aa:bb:cc:dd:ee:ff". The MAC address of the router 26 is "00:11:22:33:44:55".

Next, the data structure of the quality information storage unit 130 within the redirect device 100 will be described. In the quality information storage unit 130, information is stored that relates to the communication quality of each of the terminal devices 31 to 38.

FIG. 9 is a diagram illustrating an example of the data structure of a quality information storage unit. In the quality information storage unit 130, a quality management table 131 is stored.

In the quality management table 131, the columns of a transmission source IP address, a destination IP address, the number of transmitted packets, the number of received packets, the number of transmitting side lost packets, the number of receiving side lost packets, and a quality analysis result are provided. Pieces of information coordinated with the lateral direction of each column are associated with one another, and entered as information relating to the communication quality of a terminal device.

In the column of the transmission source IP address, the IP address of a terminal device that has transmitted a request message to the server 300 is set.

In the column of the destination IP address, the IP address of the server 300 serving as the destination of the request message is set.

In the column of the number of transmitted packets, the number of packets (the number of transmitted packets) is set, the packets having been transmitted from the terminal device to the server 300 within a given time period.

In the column of the number of received packets, the number of packets (the number of received packets) is set, the packets having been transmitted from the server 300 to the terminal device within a given time period.

In the column of the number of transmitting side lost packets, the number of lost packets (the number of transmitting side lost packets) is set, from among packets that have been transmitted from the terminal device to the server 300 within a given time period. For example, in the number of transmitting side lost packets, the number of packets not acquired by the redirect device 100 is set, from among packets that have been transmitted from the terminal device to the server 300 within a given time period.

In the column of the number of receiving side lost packets, the number of lost packets (the number of receiving side lost packets) is set, from among packets that have been transmitted from the server 300 to the terminal device within a given time period. For example, in the number of receiving side lost packets, the number of packets not acquired by the redirect device 100 is set, from among packets that have been transmitted from the server 300 to the terminal device within a given time period.

In the column of a quality analysis result, a flag is set that indicates the result of normality determination for communication quality due to the quality measurement unit 120. For example, when the communication quality has been determined to be good, a circle is set in the column of a quality analysis result. On the other hand, when the communication quality has been determined to be poor, an x-mark is set in the column of a quality analysis result.

In the example in FIG. 9, with respect to each of the terminal devices 31 to 34 whose IP addresses are "192.168.1.10", "192.168.1.20", "192.168.1.15", and "192.168.1.25", it has been determined that the communication quality thereof is poor. In this case, the quality measurement unit 120 notifies the switching control unit 141 of the IP addresses of the terminal devices 31 to 34 whose communication quality is poor, as targets of switching.

Therefore, on the basis of the notification of the IP addresses of the terminal devices serving as targets of switching, received from the quality measurement unit 120, the switching control unit 141 controls the ARP table 310 in the server 300. In controlling the ARP table 310, first, the switching control unit 141 collects the ARP table 310 from the server 300.

Figure 10:
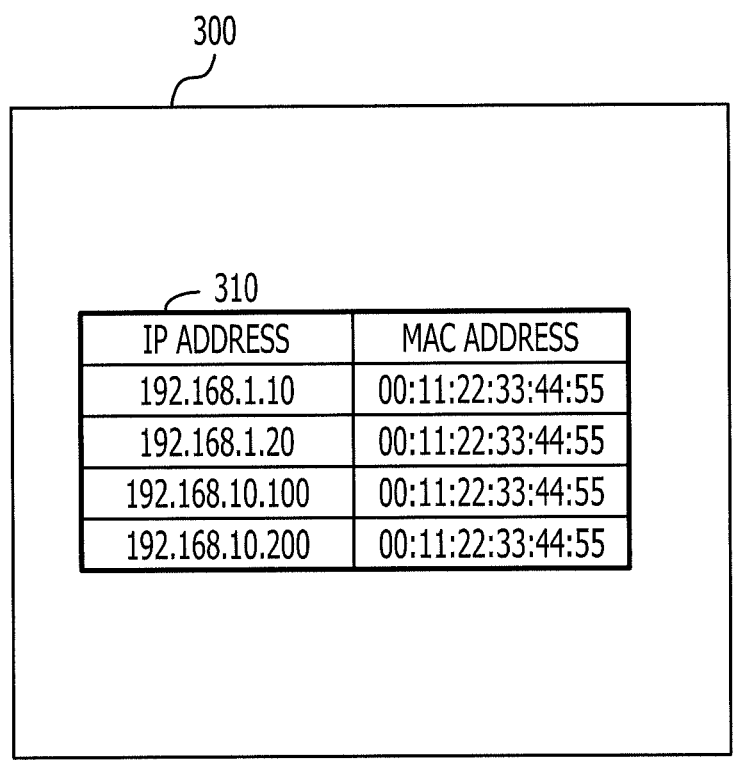
FIG. 10 is a diagram illustrating an example of a data structure of an ARP table.

FIG. 10 is a diagram illustrating an example of the data structure of an ARP table. In the ARP table 310, a pair of an IP address and a MAC address is set.

In the column of an IP address, the IP address of a terminal device that has established communication with the server 300 is set. In the column of a MAC address, a MAC address is set that is to be the destination of a frame in a data link layer when a packet to be transmitted and addressed to a terminal device indicated by a corresponding IP address is transmitted. For example, with being associated with the IP address of a terminal device outside the scope of redirect, the MAC address of a router adjacent to the server 300 on a communication path between the terminal device and the server 300 is set in the column of an MAC address. In addition, with being associated with the IP address of a terminal device serving as a target of redirect, the MAC address of the communication interface 107 in the redirect device 100 is set in the column of an MAC address.

The example in FIG. 10 is the ARP table 310 in a state before a terminal device to be a target of redirect is detected. Therefore, in the columns of MAC addresses of all entries, the MAC address, "00:11:22:33:44:55", of the router 26 is set.

In the ARP table 310 in the server 300, the entry of a terminal device is cleared where, for a given retention period (Aging time), no communication is established. For example, it is assumed that the Aging time of the ARP table 310 in the server 300 is set in the order of several minutes (for example, five minutes).

Next, redirect processing executed in the redirect device 100 will be described.

Figure 11:
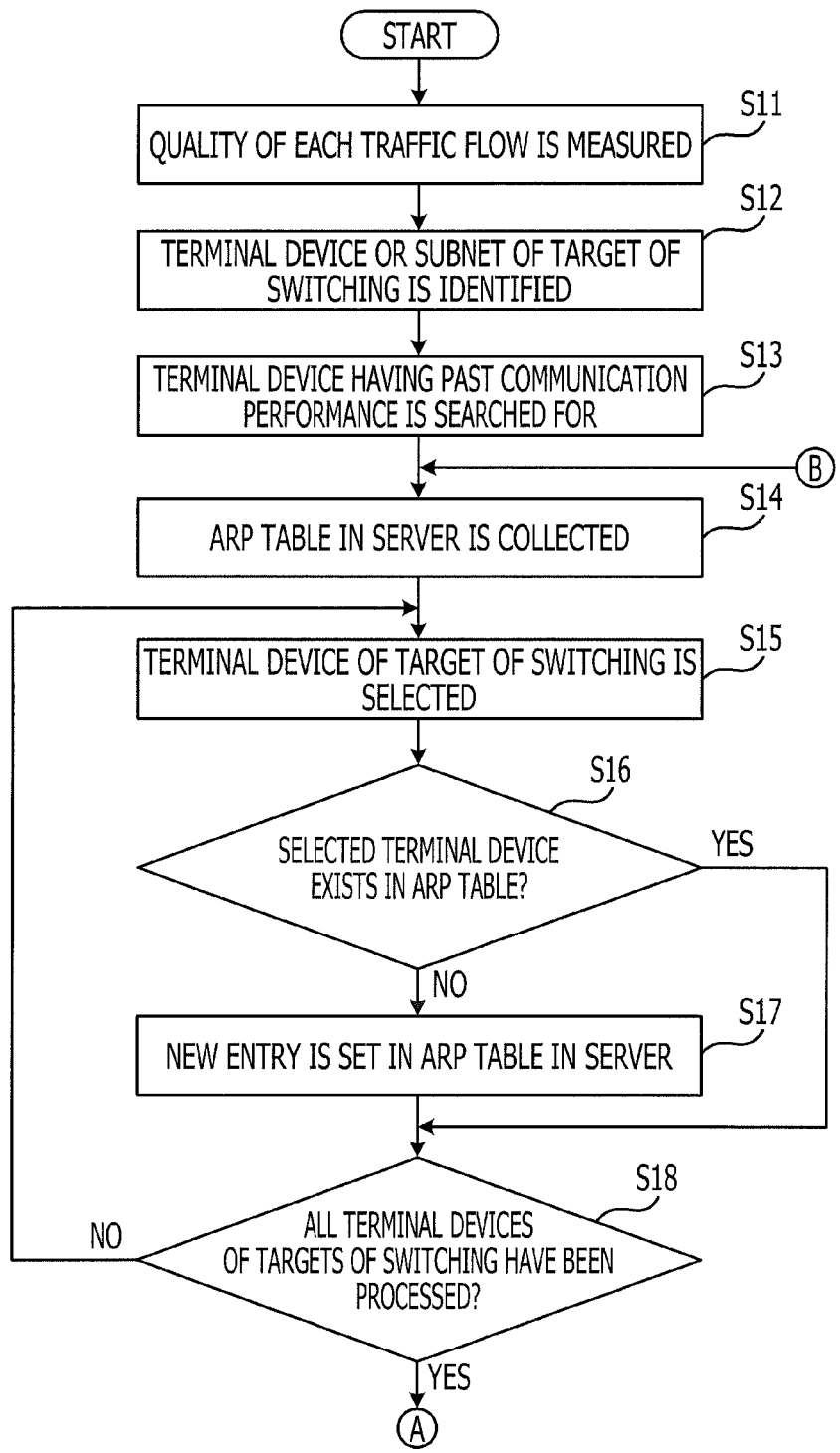
FIG. 11 is an anterior half of a flowchart illustrating an example of a procedure of redirect processing.

FIG. 11 is an anterior half of a flowchart illustrating an example of the procedure of the redirect processing. Hereinafter, the processing illustrated in FIG. 11 will be described along step numbers.

[S11] The quality measurement unit 120 measures the quality of the traffic flow of each terminal device. For example, with respect to each traffic flow, the quality measurement unit 120 counts the number of transmitted packets from a terminal device, the number of received packets, the number of transmitting side lost packets, and the number of receiving side lost packets. In addition, on the basis of a count result, the quality measurement unit 120 determines the normality of communication quality. For example, when the ratio of the total value of the number of transmitting side lost packets and the number of receiving side lost packets to the total value of the number of transmitted packets and the number of received packets is less than a given threshold value, the quality measurement unit 120 determines that the quality is good. When the ratio of the total value of the number of transmitting side lost packets and the number of receiving side lost packets to the total value of the number of transmitted packets and the number of received packets is greater than or equal to a given threshold value, the quality measurement unit 120 determines that the quality is poor.

In addition, the quality measurement unit 120 creates a quality management table in which the measurement result of communication quality and the normality determination result of quality are registered with respect to the traffic flow of each terminal device, and stores the quality management table in the quality information storage unit 130.

[S12] On the basis of the IP address of a terminal device where the quality is deteriorated, the quality measurement unit 120 identifies the terminal device or the subnet of a target of switching. For example, when the number of terminal devices where the quality is deteriorated is greater than or equal to a given number, the terminal devices being located within a same subnet, the quality measurement unit 120 identifies the whole subnet as a target of switching. When the number of terminal devices where the quality is deteriorated is less than the given number, the terminal devices being located within the same subnet, the quality measurement unit 120 identifies, as targets of switching, the terminal devices where the quality is deteriorated.

[S13] When having identified the subnet as a target of switching, the quality measurement unit 120 searches for a terminal device, which has a past communication performance and is located within the corresponding subnet. For example, the quality measurement unit 120 refers to the quality management table 131 within the quality information storage unit 130, and searches for the IP address of a terminal device within the subnet of a target of switching, on the basis of a transmission source IP address within the quality management table 131. In addition, the quality measurement unit 120 defines, as the terminal device of a target of switching, a terminal device corresponding to an IP address obtained as a search result. In addition, the quality measurement unit 120 notifies the switching control unit 141 of the IP address of the terminal device of a target of switching.

[S14] The switching control unit 141 collects the ARP table 310 in the server 300. For example, the switching control unit 141 transmits a command of SNMP, used for acquiring the ARP table 310, to the server 300 through the transmission and reception unit 150. Therefore, the server 300 responds with the ARP table 310. The switching control unit 141 stores the ARP table 310 collected from the server 300, in the ARP management unit 142.

[S15] The switching control unit 141 selects one terminal device of a target of switching.

[S16] The switching control unit 141 determines whether or not the selected terminal device has been registered in the ARP table 310 collected from the server 300. For example, when the IP address of the selected terminal device has been registered in the column of an IP address in the ARP table 310, the switching control unit 141 determines that the terminal device has been registered. When the selected terminal device has been registered, the switching control unit 141 causes the processing to proceed to S18. When the selected terminal device has not been registered, the switching control unit 141 determines the selected terminal device is capable of being immediately redirected, and causes the processing to proceed to S17.

[S17] In the ARP table 310 in the server 300, the switching control unit 141 registers the entry of the terminal device determined to be capable of being immediately redirected. The entry to be registered includes the IP address of the selected terminal device and the MAC address of the redirect device 100. For example, the switching control unit 141 logs in to the server 300 using a remote login command such as telnet or the like, and executes an arp command. Accordingly, it is possible for the switching control unit 141 to register a new record in the ARP table 310 within the server 300.

[S18] With respect to all terminal devices of targets of switching, the switching control unit 141 determines whether or not the processing operations in S15 to S17 have been executed. When the processing has been executed with respect to all corresponding terminal devices, the switching control unit 141 causes the processing to proceed to S21 (refer to FIG. 12). When an unprocessed terminal device exists from among the corresponding terminal devices, the switching control unit 141 causes the processing to proceed to S15.

Figure 12:
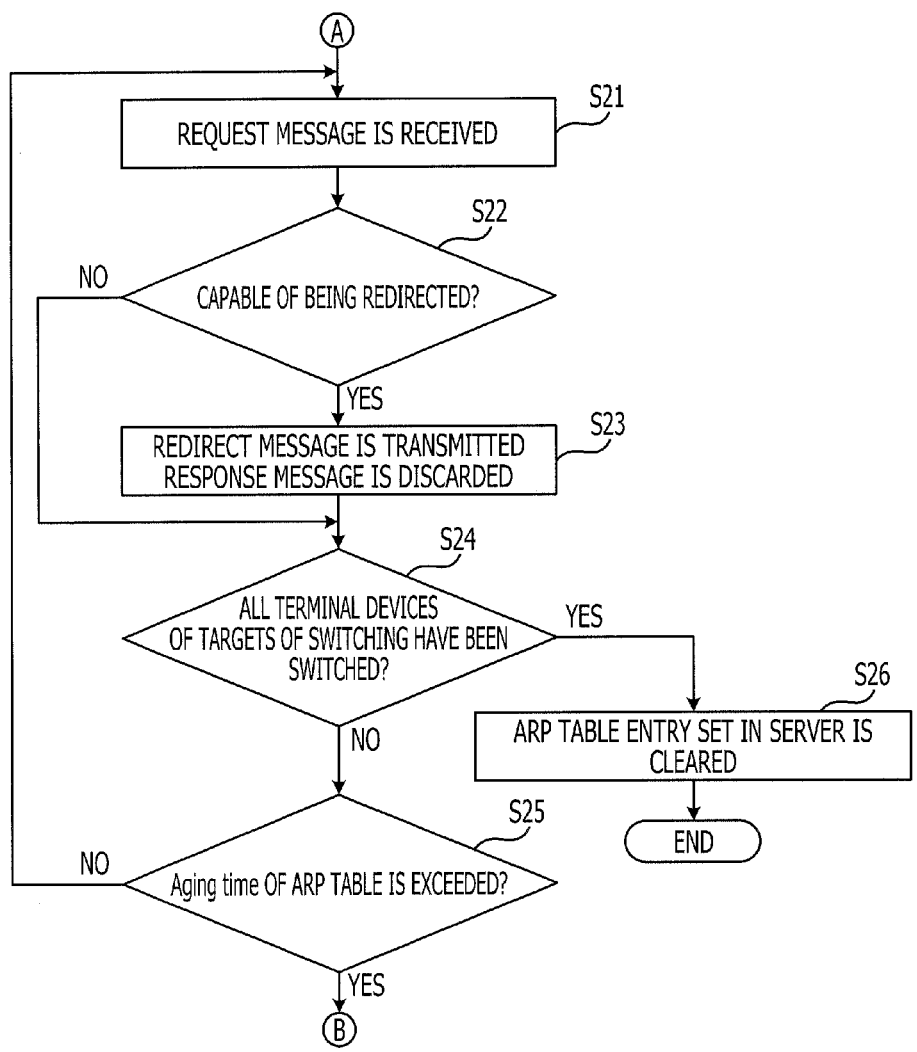
FIG. 12 is a posterior half of the flowchart illustrating an example of the procedure of the redirect processing.

FIG. 12 is a posterior half of the flowchart illustrating an example of the procedure of the redirect processing. Hereinafter, the processing illustrated in FIG. 12 will be described along step numbers.

[S21] Through the capture unit 110, the switching control unit 141 receives a request message from one of terminal devices to the server 300.

[S22] The switching control unit 141 determines whether or not the received request message is a request message transmitted from the terminal device determined to be capable of being immediately redirected. When the received request message is a request message transmitted from the terminal device determined to be capable of being immediately redirected, the switching control unit 141 causes the processing to proceed to S23. When the received request message is not a request message transmitted from the terminal device determined to be capable of being immediately redirected, the switching control unit 141 causes the processing to proceed to S24.

[S23] The switching control unit 141 transmits a redirect message to the terminal device determined to be capable of being immediately redirected. For example, in the redirect message, the server 300a is designated as a redirect destination. In the terminal device to which the redirect message has been transmitted, the transmission destination of a request message is switched to the server of a redirect destination.

The transmission and reception unit 150 receives a response message from the server 300, which corresponds to the request message received in S21. In addition, the transmission and reception unit 150 discards the received response message.

[S24] The switching control unit 141 determines whether or not the transmission destinations of the request messages of all terminal devices of targets of switching have been switched. When the switching of all corresponding terminal devices has been completed, the switching control unit 141 causes the processing to proceed to S26. When a terminal device exists where the switching has not been completed, the switching control unit 141 causes the processing to proceed to S25.

[S25] The switching control unit 141 determines whether or not a time, which has elapsed after the ARP table 310 was collected in S14, exceeds the Aging time of the ARP table 310 in the server 300. When the time exceeds the retention period, the switching control unit 141 causes the processing to proceed to S14, and repeats the processing of the collection of the ARP table 310 and the processing subsequent thereto, again. When the time does not exceed the retention period, the switching control unit 141 causes the processing to proceed to S21.

[S26] The switching control unit 141 clears the entry to the ARP table 310, set in the server 300 in the processing in S17.

In this way, it is possible to transmit a redirect message to the terminal device of a target of switching and cause an access destination to be switched to another server. In addition, when the whole segment is defined as a target of switching, a terminal device whose past communication performance is confirmed is only defined as a target of switching. Accordingly, a situation that the reception of a request message from a terminal device that does not exist is waited for and hence it is difficult to terminate the redirect processing is deterred from occurring.

For example, it is assumed that, as a result of quality measurement, the quality management table 131 illustrated in FIG. 9 is generated. In the example in FIG. 9, with respect to all terminal devices in the subnet of "192.168.1.0", quality deterioration has occurred in the network. Therefore, it is assumed that all terminal devices in the subnet of "192.168.1.0" become targets of switching.

In this case, the redirect device 100 collects the ARP table 310 from the server 300, and arbitrarily controls the content of the ARP table 310. The control of the ARP table 310 in the server 300, performed by the redirect device 100, may be performed using an SNMP, for example.

Figure 13:
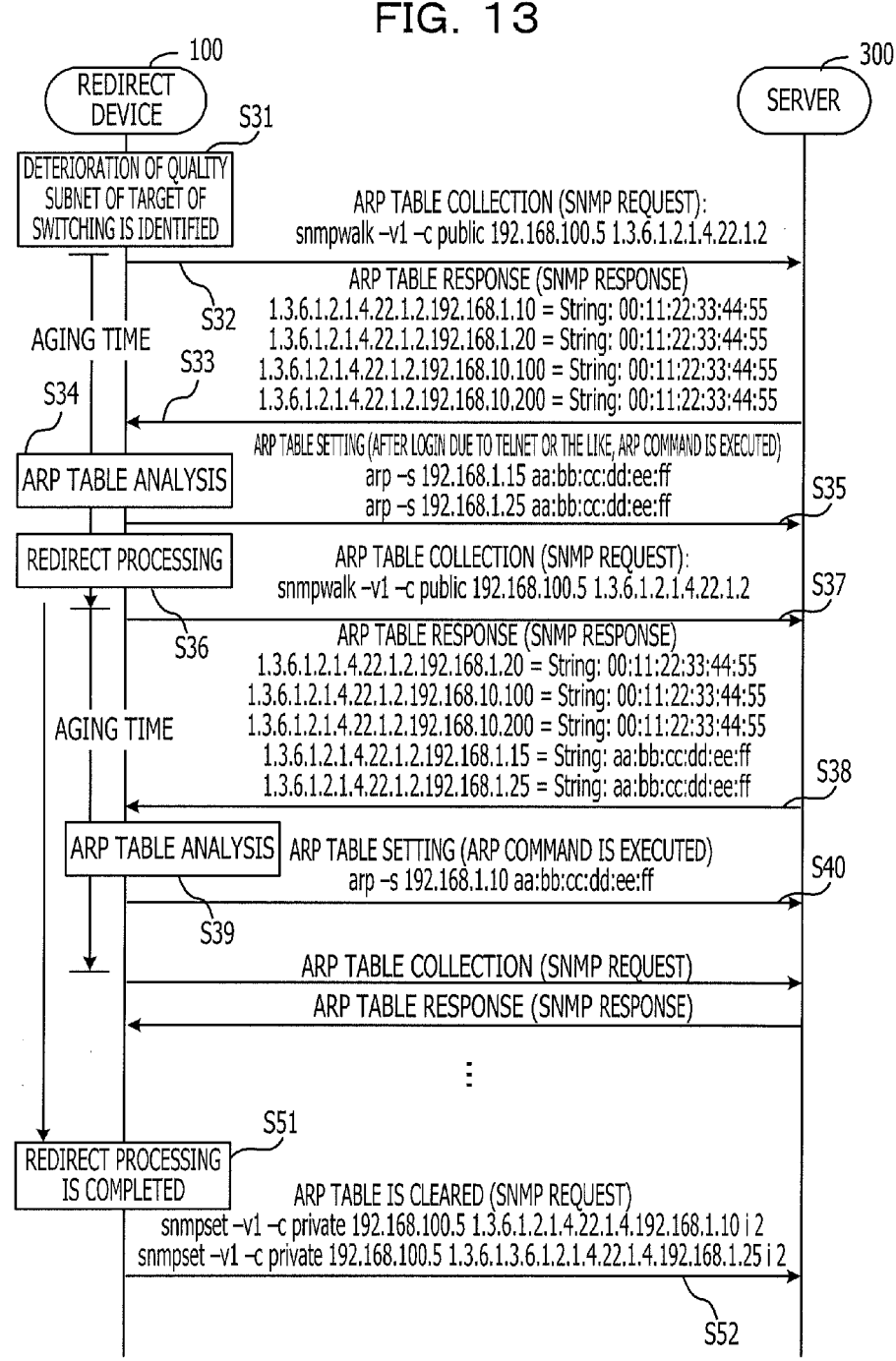
FIG. 13 is a sequence diagram illustrating an example of a procedure of control of the ARP table.

FIG. 13 is a sequence diagram illustrating an example of the procedure of the control of the ARP table. Hereinafter, processing illustrated in FIG. 13 will be described along step numbers.

[S31] The quality measurement unit 120 in the redirect device 100 identifies a subnet of a target of switching, associated with the deterioration of communication quality, as "192.168.1.0".

[S32] the switching control unit 141 transmits, to the server 300, an SNMP request used for collecting the ARP table 310. For example, the SNMP request is transmitted whose content is "snmpwalk-v1-c public 192.168.100.5 1.3.6.1.2.1.4.22.1.2".

[S33] In reply to the SNMP request, the server 300 responds with the ARP table 310 owing to an SNMP response. For example, the SNMP response includes the following content.

"1.3.6.1.2.1.4.22.1.2.192.168.1.10=String: 00:11:22:33: 44:551.3.6.1.2.1.4.22.1.2.192.168.1.20=String: 00:11:22: 33:44:551.3.6.1.2.1.4.22.1.2.192.168.10.100=String: 00:11: 22:33:44:551.3.6.1.2.1.4.22.1.2.192.168.10.200=String: 00:11:22:33:44:55"

[S34] The switching control unit 141 in the redirect device 100 that has received the SNMP response analyzes the content of the acquired ARP table 310. In addition, from among the IP addresses of terminal devices having communication performances in the subnet of "192.168.1.0", the switching control unit 141 detects IP addresses, "192.168.1.15" and "192.168.1.25", which have not been registered in the ARP table 310. In addition, the switching control unit 141 defines the detected IP addresses as the IP addresses of the terminal devices 33 and 34 capable of being immediately redirected.

[S35] The switching control unit 141 remotely logs in to the server 300, executes, for example, the following arp command, and registers a new entry in the ARP table 310. "arp -s 192.168.1.15 aa:bb:cc:dd:ee:ffarp -s 192.168.1.25 aa:bb:cc: dd:ee:ff"

[S36] In response to request messages whose transmission sources are the IP address, "192.168.1.15" and "192.168.1.25", and that are addressed to the server 300, the redirect device 100 performs the redirect processing. For example, in the redirect processing, transmitting a redirect message due to the switching control unit 141 and discarding a response message from the server 300 owing to the transmission and reception unit 150 are performed.

[S37] When the Aging time has elapsed after the ARP table collection processing in S32, the switching control unit 141 transmits, to the server 300, an SNMP request used for collecting the ARP table 310, again. The content of the SNMP request is the same as the case in S32.

[S38] In reply to the SNMP request, the server 300 responds with the ARP table 310 owing to an SNMP response. Here, it is assumed that communication between the terminal device 31 of the IP address "192.168.1.10" and the server 300 has been terminated and the ARP table 310 at this time does not include the entry of the IP address "192.168.1.10". In this case, for example, the SNMP response includes the following content.

"1.3.6.1.2.1.4.22.1.2.192.168.1.20=String: 00:11:22:33: 44:551.3.6.1.2.1.4.22.1.2.192.168.10.100=String: 00:11:22: 33:44:551.3.6.1.2.1.4.22.1.2.192.168.10.200=String: 00:11: 22:33:44:551.3.6.1.2.1.4.22.1.2.192.168.1.15=String: aa:bb: cc:dd:ee:ff1.3.6.1.2.1.4.22.1.2.192.168.1.25=String: aa:bb: cc:dd:ee:ff"

[S39] The switching control unit 141 in the redirect device 100 that has received the SNMP response analyzes the content of the acquired ARP table 310. In addition, from among the IP addresses of terminal devices having communication performances in the subnet of "192.168.1.0", the switching control unit 141 detects, as the IP address of the terminal device 31 capable of being immediately redirected, an IP address "192.168.1.10" which has not been registered in the ARP table 310.

[S40] The switching control unit 141 remotely logs in to the server 300, executes, for example, the following arp command, and registers a new entry in the ARP table 310. "arp -s 192.168.1.10 aa:bb:cc:dd:ee:ff"

After that, in the same way, the processing of the collection of the ARP table 310 and the processing subsequent thereto are repeated. In addition, when communication between the terminal device 32 of the IP address "192.168.1.20" and the server 300 has been terminated, the redirect processing for the terminal device 32 is performed.

[S51] The switching control unit 141 determines that the redirect processing for all terminal devices having communication performances within the subnet of a target of switching has been completed. For example, when the subnet of a target of switching has been identified in S31, the switching control unit 141 retains the list of the IP addresses of all terminal devices having communication performances within the subnet of a target of switching. The switching control unit 141 deletes, from the list, the IP address of a terminal device on which the redirect processing has been executed. In addition, when the list has become empty, the switching control unit 141 determines that the redirect processing has been completed.

[S52] The switching control unit 141 transmits, to the server 300, an SNMP request used for clearing entries within the ARP table 310. For example, an SNMP request having the following content is transmitted.

"snmpset -v1-c private 192.168.100.5 1.3.6.1.2.1.4.22.1.4.192.168.1.10 i 2snmpset -v1-c private 192.168.100.5 1.3.6.1.3.6.1.2.1.4.22.1.4.192.168.1.25 i 2"

In this way, in the redirect device 100, when the terminal device of a target of switching has been identified, the ARP table 310 is collected from the server 300. After that, the IP address of the terminal device of a target of switching is compared with an entry in the ARP table 310, and the IP address of a terminal device that has not established communication is registered in the ARP table 310 in the server 300 with being associated with the MAC address of the redirect device 100.

Figure 14:
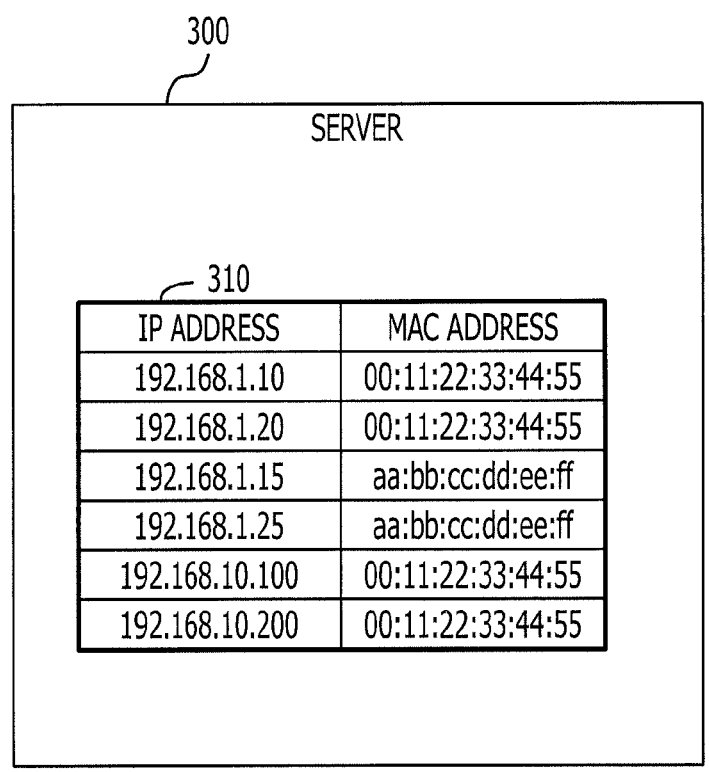
FIG. 14 is a diagram illustrating an example of the ARP table after update.

FIG. 14 is a diagram illustrating an example of an ARP table after update. In the ARP table 310 illustrated in FIG. 14, entries relating to the terminal devices 33 and 34 are added to the state illustrated in FIG. 10.

In the entry of the terminal device 33, an IP address is "192.168.1.15" and a MAC address is "aa:bb:cc:dd:ee:ff". In the entry of the terminal device 34, an IP address is "192.168.1.25" and a MAC address is "aa:bb:cc:dd:ee:ff".

In addition, as the entries of the ARP table 310 illustrated in FIG. 10, the IP addresses of "192.168.1.10" and "192.168.1.20" exist. Accordingly, until, in the switching control unit 141, it has been determined that the terminal devices 31 and 32 corresponding to those IP addresses are in states of establishing communication, and the communication has been terminated, the registration of entries relating to the corresponding IP addresses, due to the switching control unit 141, is not performed.

When, on the basis of such an ARP table 310 as illustrated in FIG. 14, the server 300 has transmitted a frame in a data link layer, packets addressed to the terminal devices 33 and 34 are sent from the server 300 to the redirect device 100. Namely, in the packets addressed to the terminal devices 33 and 34 and sent from the server 300, the MAC address of the redirect device 100 is set as the destination of a frame in the data link layer. In the switch 200, on the basis of the MAC address of a destination, a communication port is determined that sends a frame sent from the redirect device 100. As a result, from a communication port to which the redirect device 100 is connected, the switch 200 sends a frame including packets sent from the redirect device 100 and addressed to the terminal devices 33 and 34. As a result, the corresponding frame is not transmitted to the terminal devices 33 and 34, and is transmitted to the redirect device 100.

Next, redirect processing will be described that is performed in a situation that the ARP table 310 illustrated in FIG. 14 is stored in the server 300.

Figure 15:
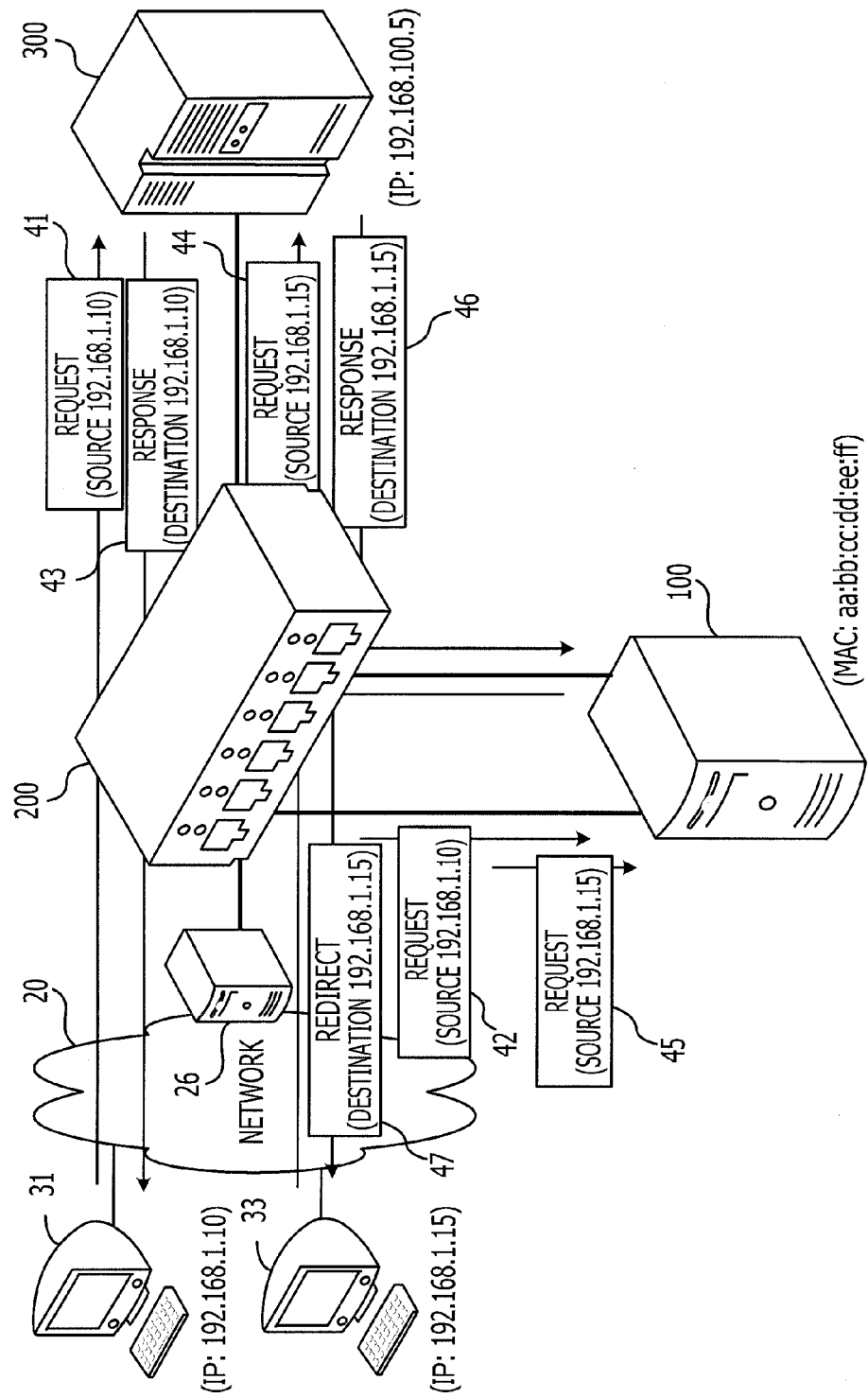
FIG. 15 is a diagram illustrating an example of redirect control performed in the second embodiment.

FIG. 15 is a diagram illustrating an example of redirect control performed in the second embodiment. The example in FIG. 15 illustrates the flows of messages when request messages 41 and 44 are transmitted from the terminal devices 31 and 33, respectively.

In FIG. 15, the IP address of a terminal device of a transmission source (Source) is illustrated in a request message. All of the IP addresses of the destinations (Destinations) of the request messages 41 and 44 illustrated in FIG. 15 are the IP address of the server 300. In a response message and a redirect message, the IP address of the terminal device of a destination is illustrated. All of the IP addresses of the transmission sources of the response message and the redirect message are the IP address of the server 300.

The request message 41 transmitted from the terminal device 31 in a state of establishing communication is transferred to the server 300 through the switch 200. At this time, in the switch 200, the duplicate copy of the request message 41 is generated, and a duplicate request message 42 is output from a mirror port. The duplicate request message 42 is input to the redirect device 100.

The server 300 that has received the request message 41 executes processing in response to the content of the request message 41, and outputs a response message 43 using a packet whose destination is the IP address of the terminal device 31. At this time, in the ARP table 310 in the server 300, the MAC address, "00:11:22:33:44:55", of the router 26 is registered with being associated with the IP address, "192.168.1.10", of the terminal device 31 (refer to FIG. 14). Accordingly, as the destination of a frame used for transmitting a packet configuring the response message 43, the MAC address of the router 26 is set. As a result, in the switch 200, the response message 43 is transferred to the router 26. In addition, the response message 43 is transferred to the terminal device 31 through the network 20.

While not illustrated in FIG. 15, when a request message addressed to the server 300 has been transmitted from a terminal device outside the scope of a target of switching, the request message is also processed in the same way as when a request message has been transmitted from the terminal device 31, and a response is sent to a terminal device using a response message.

The request message 44 transmitted from the terminal device 33 in a state of establishing no communication is transferred to the server 300 through the switch 200. At this time, in the switch 200, the duplicate copy of the request message 44 is generated, and a duplicate request message 45 is output from a mirror port. The duplicate request message 45 is input to the redirect device 100.

The server 300 that has received the request message 44 executes processing in response to the content of the request message 44, and outputs a response message 46 using a packet whose destination is the IP address of the terminal device 33. At this time, in the ARP table 310 in the server 300, the MAC address, "aa:bb:cc:dd:ee:ff", of the redirect device 100 is registered with being associated with the IP address, "192.168.1.15", of the terminal device 33 (refer to FIG. 14). Accordingly, as the destination of a frame used for transmitting a packet configuring the response message 46, the MAC address of the redirect device 100 is set. As a result, in the switch 200, the response message 46 is transferred to the redirect device 100.

In the redirect device 100, the response message 46 is discarded by the switching control unit 141. In the redirect device 100, in response to the duplicate request message 45 whose transmission source is the terminal device 33, the switching control unit 141 generates a redirect message 47 addressed to the terminal device 33, and the redirect message 47 is output through the transmission and reception unit 150. In the switch 200, the redirect message 47 is transferred to the router 26. In addition, the redirect message 47 is transferred to the terminal device 33 through the network 20.

Since, in the redirect message 47, the IP address of the server 300 is set as the IP address of a transmission source, the terminal device 33 recognizes that the redirect message 47 has been sent in reply to the request message 44. For example, the redirect message 47 includes a redirect instruction that designates the IP address of the server 300a within the data center B different from the data center A in which the server 300 is installed. Therefore, the terminal device 33 that has received the redirect message 47 newly transmits a request message to the server 300a in accordance with the instruction for redirect. Accordingly, it is possible for the terminal device 33 to receive the provision of service from the server 300a.

In this way, it is possible to switch the transmission destination of a request message from a terminal device to another server without influencing existing communication. Namely, it is possible to transmit a redirect message to a terminal device capable of being immediately redirected and guide an access destination to another server, without influencing the communication of a terminal device other than the terminal device capable of being immediately redirected.

In the server 300, when a time has elapsed by the Aging time after communication came to an end, an entry of a terminal device that does not establish communication is cleared within the ARP table 310. Therefore, in the second embodiment, the processing operations in S15 to S17 in FIG. 11 are repeated with a collection interval set in advance (for example, the same time period as the Aging time) until the redirect processing for all terminal devices that have communication performances and are targets of switching is completed. As a result, the entries of the terminal devices 31 and 32 are also deleted from the ARP table 310 when the Aging time has elapsed after the termination of communication. After that, in the ARP table 310, entries are registered where the MAC address, "aa:bb:cc:dd:ee:ff", of the redirect device 100 is associated with the IP addresses, "192.168.1.10" and "192.168.1.20", of the terminal devices 31 and 32. As a result, it is also possible to transmit redirect messages to the terminal devices 31 and 32.

For example, it is possible to establish communication between each terminal device and the server 300 owing to HTTP. Therefore, FIG. 16 to FIG. 18 illustrate examples of a message of communication established between the terminal device 33 and the server 300 owing to HTTP.

FIG. 16 is a diagram illustrating an example of a request message. The request message 44 illustrated in FIG. 16 is a message for requesting to acquire information owing to a GET command. When such a request message has been sent to the server 300, a response is sent with the response message 46 including information requested by the server 300.

FIG. 17 is a diagram illustrating an example of a response message. The response message 46 includes information requested by the terminal device 33, in addition to such header information as illustrated in FIG. 17. In this regard, however, since the terminal device 33 is a target of switching and capable of being immediately redirected, the response message 46 is discarded in the redirect device 100. In place of the response message 46, the redirect message 47 is transmitted to the terminal device 33.

FIG. 18 is a diagram illustrating an example of a redirect message. In the redirect message 47, a redirect destination is designated by "Location".

As described above, according to the second embodiment, the redirect device 100 is not engaged in communication between the terminal devices 31 to 38 and the server 300 while communication quality is good. Therefore, communication between a terminal device of a target of switching and the server 300 is deterred from being influenced. As a result, whether the performance of the redirect device 100 is good or bad does not influence communication quality such as the delay of a response between a terminal device and the server 300, or the like, and performance desired for the redirect device 100 may be lower.

When a terminal device has been detected where communication quality is deteriorated, communication relating to a terminal device other than the terminal device capable of being immediately redirected is also performed without passing through the redirect device 100. Therefore, even if redirect control is performed, communication between a terminal device other than a terminal device of a target of switching and the server 300 is also deterred from being influenced.

Furthermore, by just connecting the redirect device 100 to the mirror port of the switch 200 provided in an existing network, it is possible to control switching the access destination of a terminal device. Therefore, it is easy to apply to the existing network, and for example, it is possible to introduce a function for performing control of switching an access destination on a terminal device without halting currently-operated service in a network.

Furthermore, with respect to a terminal device currently establishing communication with the server 300, since a redirect message is transmitted after the communication has been terminated, the communication is deterred from being blocked in the middle of a series of processing operations. As a result, by performing the redirect control, negative influence on communication is suppressed.

Since the redirect control is automatically performed on the basis of quality measurement, it is possible to switch an access destination even if there is no claim from a user. Namely, it is possible to control swiftly switching an access destination.

While, in the second embodiment, the MAC address of the redirect device 100 is registered in the ARP table 310 in the server 300 with being associated with the IP address of a terminal device, another MAC address may also be registered. Namely, in the second embodiment, if a packet transmitted from the server 300 and addressed to a terminal device is to be discarded, the destination of a frame including the packet may not be the redirect device 100. For example, a MAC address other than the MAC address of the router 26 connected to the server 300 in a same segment may also be set in the ARP table 310 with being associated with the IP address of a terminal device. A transmitted frame addressed to a MAC address other than the router 26 in the same segment is not received by any device, or even if a device exists that receives the frame, the frame is not subjected to routing and hence is not transferred to a terminal device.

Next, a third embodiment will be described. In the third embodiment, in place of discarding, in a redirect device, a response message from a server, all request messages are transmitted to the redirect device. A redirect message is transmitted from the redirect device to a client of a target of switching, and the redirect device transfers, to the server, the request message of a client who is not a target of switching. The server responds with a response message corresponding to a received request message.

In addition, a system configuration in the third embodiment is the same as the system configuration of the second embodiment illustrated in FIG. 4 to FIG. 8. In this regard, however, the function of the switching control unit 141 in the third embodiment is different from that in the second embodiment. Therefore, hereinafter, the third embodiment will be described using symbols illustrated in the configuration elements of the second embodiment.

In the third embodiment, in place of controlling the ARP table 310 in the server 300, the switching control unit 141 sets an ACL in a port on the terminal device side of the switch 200 to which the redirect device 100 is connected. In this case, the switching control unit 141 sets the ACL so that a request message from a terminal device or subnet serving as a target of switching is not transferred to another port. In the third embodiment, the switching control unit 141 collects an ARP table 26a in the router 26, registers an entry in the ARP management unit 142, and identifies a terminal device in a state of establishing communication.

Figure 19:
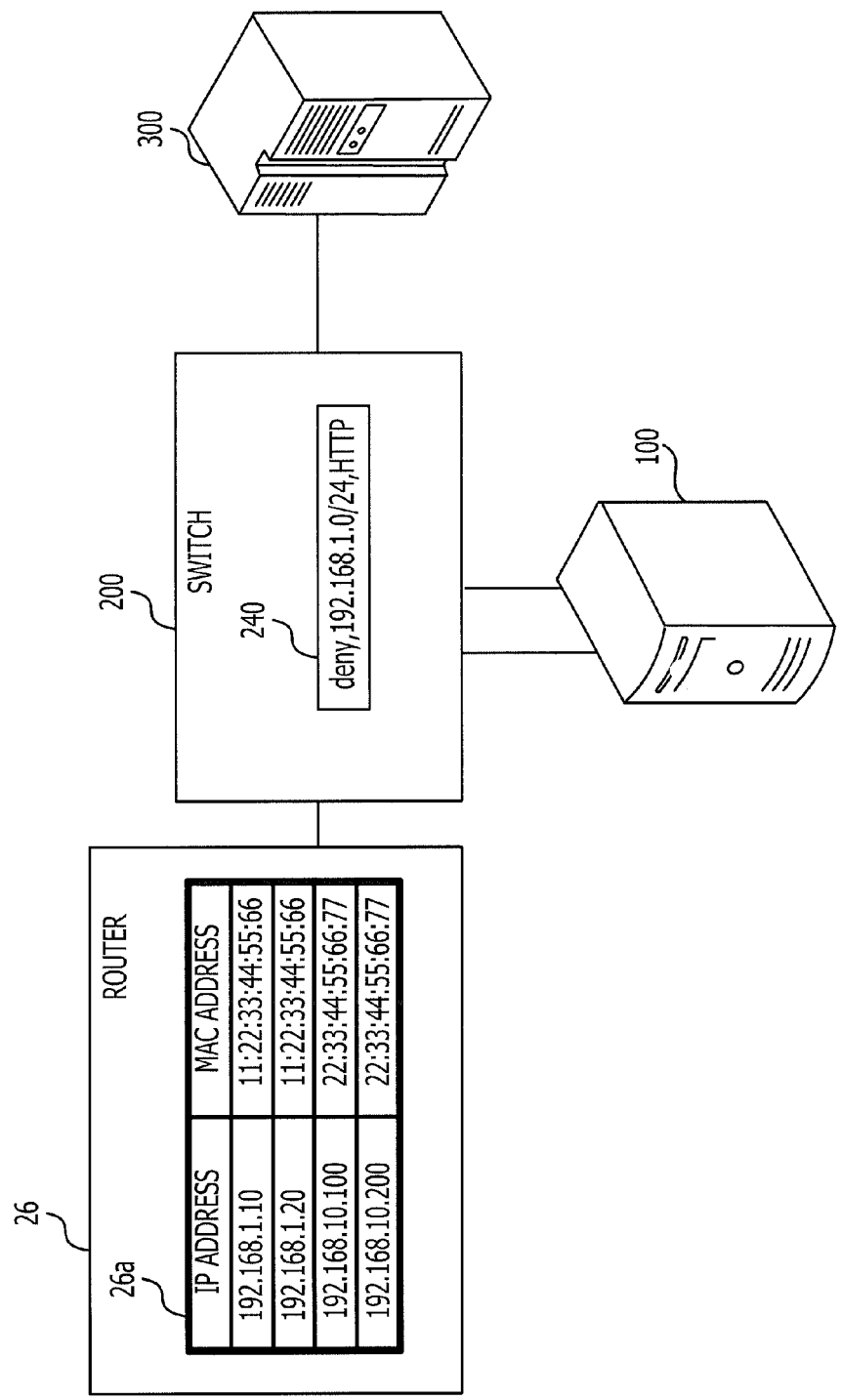
FIG. 19 is a diagram illustrating an example of information used in a third embodiment.

FIG. 19 is a diagram illustrating an example of information used in the third embodiment. In the example in FIG. 19, it is assumed that the subnet of "192.168.1.0/24" is a target of switching. "/24" in "192.168.1.0/24" indicates a subnet mask, and the upper 24 bits of "192.168.1.0" indicate a network address. In this case, for example, in the ACL 240 in the switch 200, setting is performed so as to block the inputting of a message of HTTP from "192.168.1.0/24". For example, "deny,192.168.1.0/24,HTTP" is set in the ACL 240. For example, the ACL 240 is stored in the memory 220 in the switch 200 (refer to FIG. 6).

The router 26 includes the ARP table 26a. For example, the ARP table 26a is stored in a storage device such as a RAM within the router 26. All of communication from a terminal device to the server 300 is relayed by the router 26. Therefore, by referring to the ARP table 26a within the router 26, it is possible to understand a terminal device in a state of establishing communication with the server 300.

For example, it is also possible to identify the terminal device in a state of establishing communication, using the IP address of a terminal device under measurement in the quality measurement unit 120 in the redirect device 100. A request message captured in the quality measurement unit 120 may be analyzed, and on the basis of whether the request message is a new request message, it is also possible to determine a terminal device in a state of establishing communication.

Figure 20:
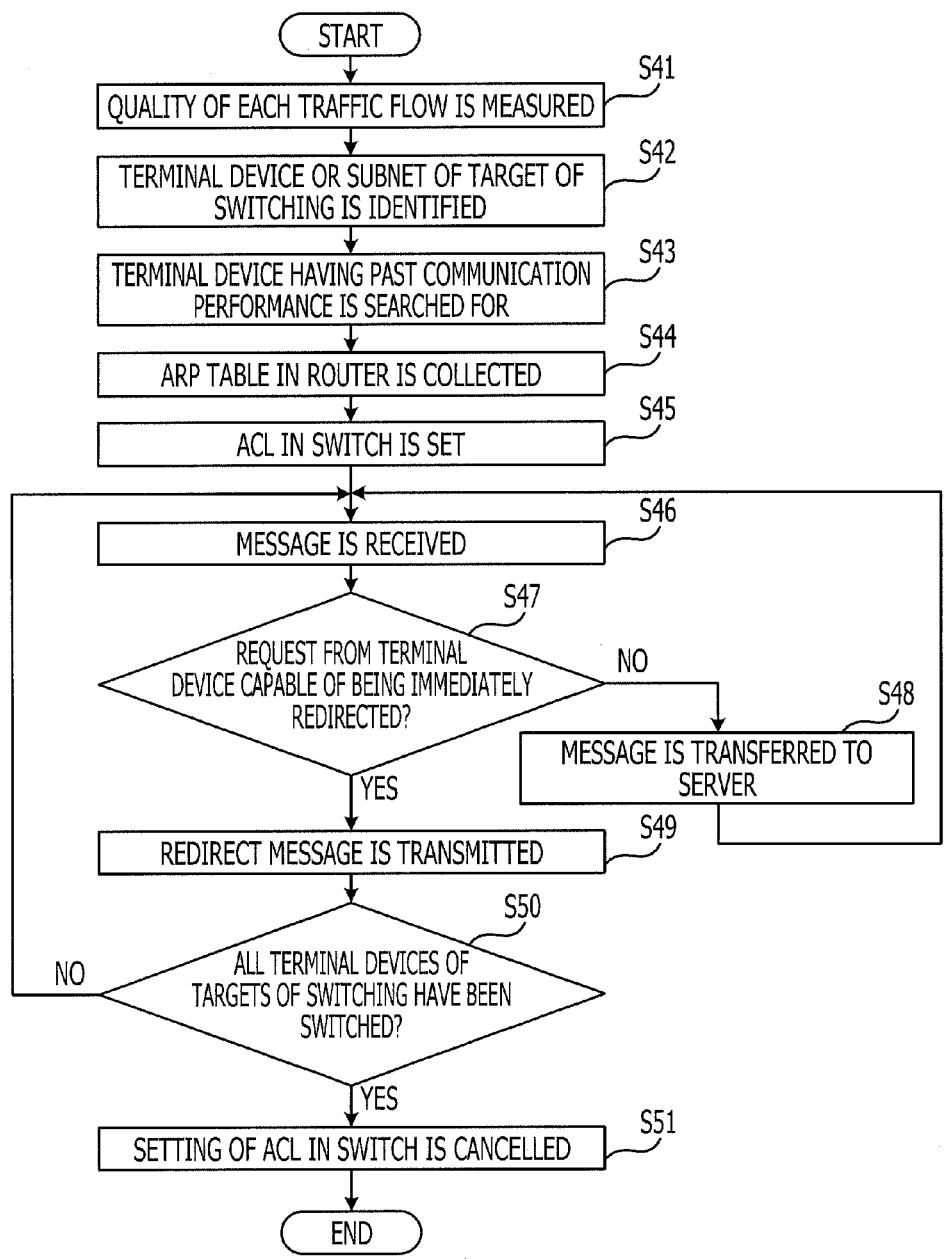
FIG. 20 is a flowchart illustrating an example of a procedure of redirect processing performed in the third embodiment.

FIG. 20 is a flowchart illustrating an example of the procedure of redirect processing performed in the third embodiment. Hereinafter, processing illustrated in FIG. 20 will be described along step numbers.

[S41] The quality measurement unit 120 measures the quality of the traffic flow of each terminal device.

[S42] On the basis of the IP address of a terminal device where the quality is deteriorated, the quality measurement unit 120 identifies a terminal device or subnet of a target of switching.

[S43] When having identified a subnet as a target of switching, the quality measurement unit 120 searches for a terminal device that has a past communication performance and is located within the corresponding subnet. In addition, the quality measurement unit 120 identifies, as a target of switching, the terminal that has a past communication performance and is located within the corresponding subnet. The quality measurement unit 120 notifies the switching control unit 141 of the IP address of the identified device of a target of switching.

[S44] The switching control unit 141 collects the ARP table 26a in the router 26. The switching control unit 141 stores the collected ARP table 26a in the ARP management unit 142.

[S45] The switching control unit 141 sets the ACL 240 in the switch 200. For example, when the whole subnet has been identified as a target of switching, the switching control unit 141 sets the ACL 240 so as to block a packet, which is sent from the subnet of a target of switching and input to a port connected to the router 26. When, separately from a terminal device within the subnet set as a target of switching, an individual terminal device has been identified as a target of switching, the switching control unit 141 sets the ACL 240 so as to block a packet, which is sent from the corresponding terminal device and input to a port connected to the router 26.

[S46] The switching control unit 141 receives a message indicated by a packet captured in the capture unit 110.

[S47] The switching control unit 141 determines whether or not the received message is a request from a terminal device that is a target of switching and capable of being immediately redirected. By referring to the ARP table 26a acquired in S44, it is determined whether or not the terminal device is capable of being immediately redirected. If the entry of the IP address of the transmission source of the acquired request message is not included in the acquired ARP table 26a, it is possible to determine that a terminal device corresponding to the IP address of the transmission source is a terminal device capable of being immediately redirected. When the request is a request from a terminal device that is a target of switching and capable of being immediately redirected, the switching control unit 141 causes the processing to proceed to S49. When the request is not a request from a terminal device that is a target of switching and capable of being immediately redirected, the switching control unit 141 causes the processing to proceed to S48.

[S48] The switching control unit 141 transfers the request message to the server 300. After that, the switching control unit 141 causes the processing to proceed to S46.

[S49] The switching control unit 141 transmits a redirect message to a terminal device serving as the transmission source of the received request message. For example, the transmitted redirect message includes an instruction for redirecting to the server 300a. In this case, the message received in S46 is discarded.

[S50] The switching control unit 141 determines whether or not redirect messages have been transmitted to all terminal devices of targets of switching and control of switching access destinations has been performed. When the switching control for all terminal devices of targets of switching has been completed, the switching control unit 141 causes the processing to proceed to S51. When a terminal device of a target of switching exists where the switching of an access destination has not been performed, the switching control unit 141 causes the processing to proceed to S46.

[S51] The switching control unit 141 cancels the setting of the ACL 240 in the switch 200, performed in S45.

In this way, by utilizing the ACL 240 in the switch 200, it is possible to block a request message from a terminal device of a target of switching from being sent to the server 300 and it is possible for the redirect device 100 to respond with a redirect message, in reply to the request message.

Figure 21:
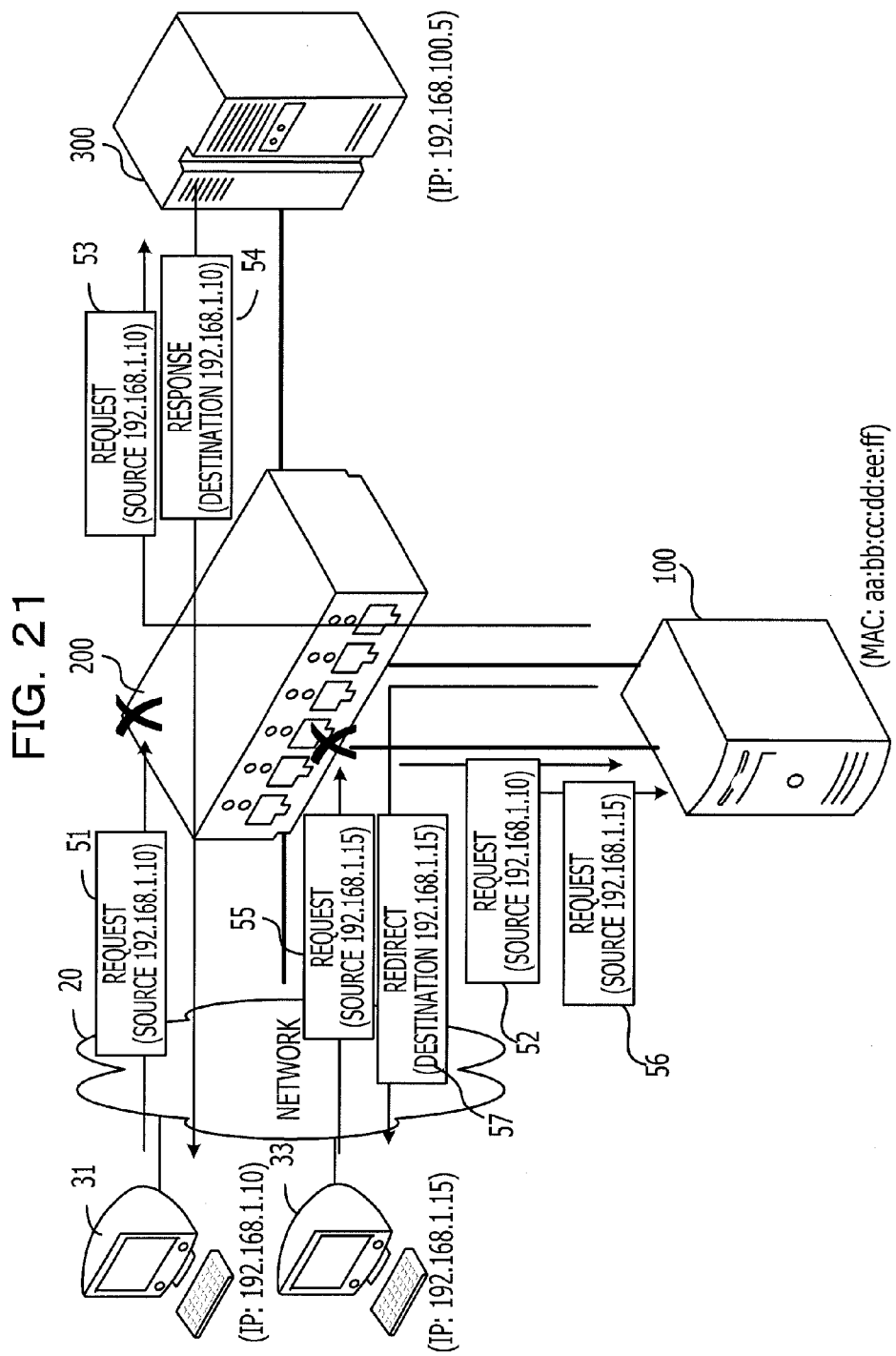
FIG. 21 is a diagram illustrating an example of redirect control performed in the third embodiment.

FIG. 21 is a diagram illustrating an example of redirect control performed in the third embodiment. The example in FIG. 21 illustrates the flow of messages when request messages 51 and 55 are transmitted from the terminal devices 31 and 33, respectively. As illustrated in FIG. 19, it is assumed that the whole subnet of "192.168.1.0/24" is a target of switching and the communication performed by the corresponding subnet is blocked in the switch 200. As illustrated in the ARP table 26a in FIG. 19, it is assumed that, while the terminal device 31 whose IP address is "192.168.1.10" is in a state of establishing communication, the terminal device 33 whose IP address is "192.168.1.15" is in a state of establishing no communication.

The request message 51 transmitted from the terminal device 31 in a state of establishing communication is blocked in the switch 200. At this time, in the switch 200, the duplicate copy of the request message 51 is generated and a duplicate request message 52 is output from a mirror port. The duplicate request message 52 is input to the redirect device 100.

Since the terminal device 31 is in a state of establishing communication, the redirect device 100 that has received the duplicate request message 52 transmits, to the server 300, a request message 53 whose content is the same as the duplicate request message 52. The server 300 that has received the request message 53 executes processing in accordance with the content of the request message 53, and outputs a response message 54 using a packet whose destination is the IP address of the terminal device 31. The response message 54 is transferred to the router 26 through the switch 200. In addition, the response message 54 is transferred to the terminal device 31 through the network 20.

While not illustrated in FIG. 21, when a request message addressed to the server 300 has been transmitted from a terminal device outside the scope of a target of switching, the request message is sent to the server 300 without being blocked in the switch 200, and the server 300 responds with a response message.

The request message 55 transmitted from the terminal device 33 in a state of establishing no communication is blocked in the switch 200. At this time, in the switch 200, the duplicate copy of the request message 55 is generated, and a duplicate request message 56 is output from a mirror port. The duplicate request message 56 is input to the redirect device 100.

In the redirect device 100 that has received the duplicate request message 56, a redirect message 57 addressed to the terminal device 33 is generated by the switching control unit 141, and the redirect message 57 is output through the transmission and reception unit 150. The redirect message 57 is transferred to the router 26, in the switch 200. In addition, the redirect message 57 is transferred to the terminal device 33 through the network 20.

For example, the redirect message 57 includes a redirect instruction that designates the IP address of the server 300a within the data center B different from the data center A in which the server 300 is installed. Therefore, in accordance with the instruction for redirect, the terminal device 33 that has received the redirect message 57 newly transmits a request message to the server 300a. Accordingly, it is possible for the terminal device 33 to receive the provision of service from the server 300a.

In this way, it is possible to switch the transmission destination of a request message from a terminal device to another server without influencing existing communication. Namely, it is possible to transmit a redirect message to a terminal device capable of being immediately redirected and guide an access destination to another server, without influencing the communication of a terminal device other than the terminal device capable of being immediately redirected.

Next, a fourth embodiment will be described. In the fourth embodiment, when a terminal device has been detected whose communication quality is deteriorated, all request messages are transmitted to a redirect device. The redirect device transmits a redirect message to a terminal device that is capable of being immediately redirected and a target of switching, and transfers, to a server, a request message of a terminal device that is not capable of being immediately redirected and a target of switching. In this way, the server is caused to respond with only a normal response message.

A system configuration in the fourth embodiment is the same as the system configuration of the second embodiment illustrated in FIG. 4 to FIG. 8. In this regard, however, the function of the switching control unit 141 in the fourth embodiment is different from that in the second embodiment. Therefore, hereinafter, the fourth embodiment will be described using symbols illustrated in the configuration elements of the second embodiment.

In the fourth embodiment, so as to transmit all request messages to the redirect device 100, the ARP table 26a in the router 26 is operated. For example, when having detected a terminal device whose communication quality is deteriorated, the redirect device 100 rewrites a MAC address in the entry of the IP address of the server 300 within the ARP table 26a in the router 26 so that the MAC address becomes the MAC address of the redirect device 100.

Figure 22:
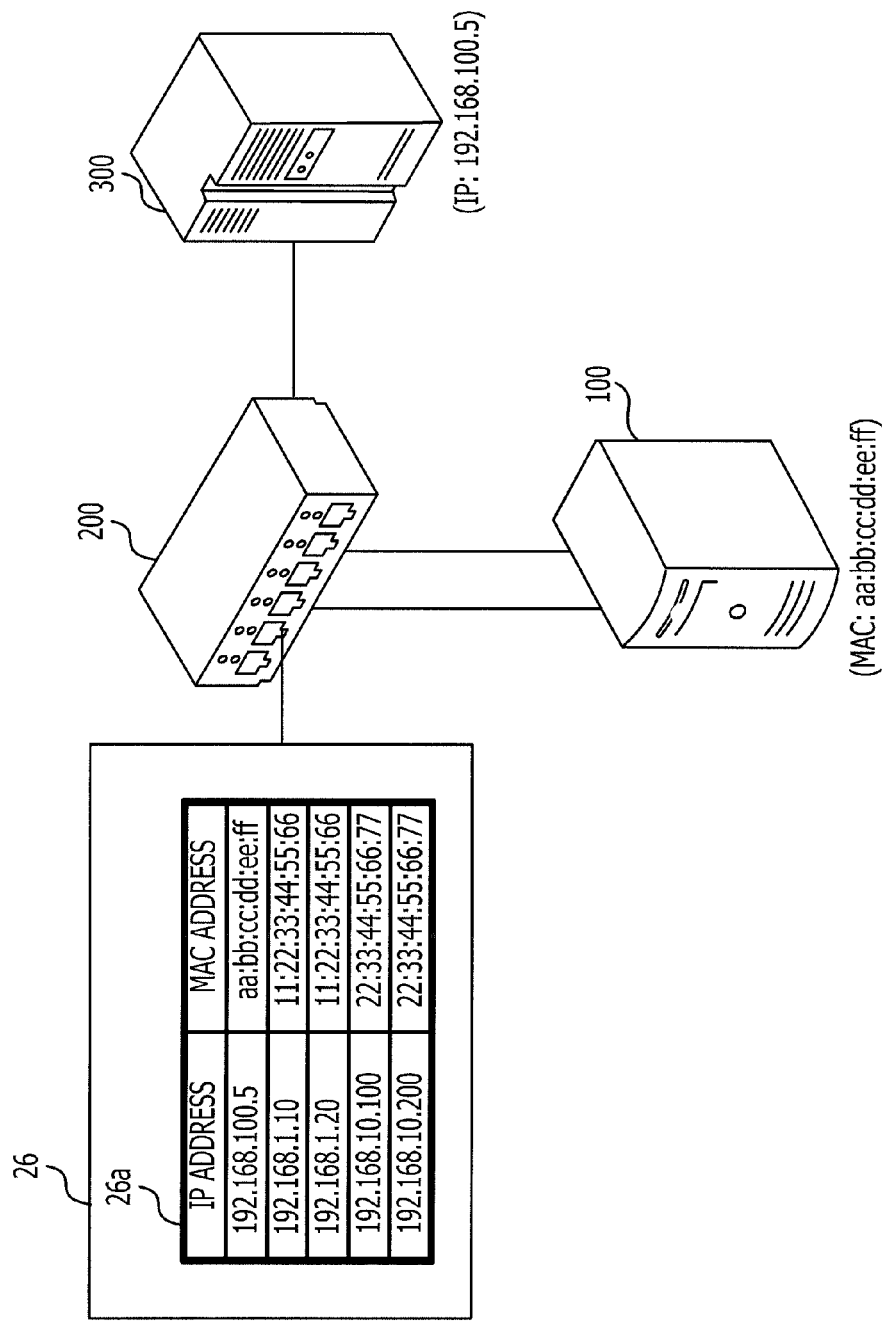
FIG. 22 is a diagram illustrating an example of an ARP table in a router after update.

FIG. 22 is a diagram illustrating an example of an ARP table in a router after update. In the ARP table 26a in the router 26, an entry is registered where the MAC address, "aa:bb:cc:dd:ee:ff", of the redirect device 100 is set with being associated with the IP address, "192.168.100.5", of the server 300. When the router 26 has transferred a packet on the basis of such an ARP table 26a as described above, the MAC address, "aa:bb:cc:dd:ee:ff", of the redirect device 100 is set as the destination of a frame including the transferred packet. Therefore, the frame whose destination is the MAC address, "aa:bb:cc:dd:ee:ff", of the redirect device 100 is transferred to the redirect device 100, in the switch 200. In this way, it is possible to transfer, to the redirect device 100, all IP packets addressed to the server 300.

The switching control unit 141 in the redirect device 100 collects the ARP table 26a in the router 26, and registers the ARP table 26a in the ARP management unit 142. In addition, on the basis of the acquired ARP table 26a, the switching control unit 141 identifies a terminal device in a state of establishing communication. For example, it is also possible to identify the terminal device in a state of establishing communication, using the IP address of a terminal device under measurement in the quality measurement unit 120 in the redirect device 100. A request message captured in the quality measurement unit 120 may be analyzed, and on the basis of whether the request message is a new request message, it is also possible to determine a terminal device in a state of establishing communication.

Figure 23:
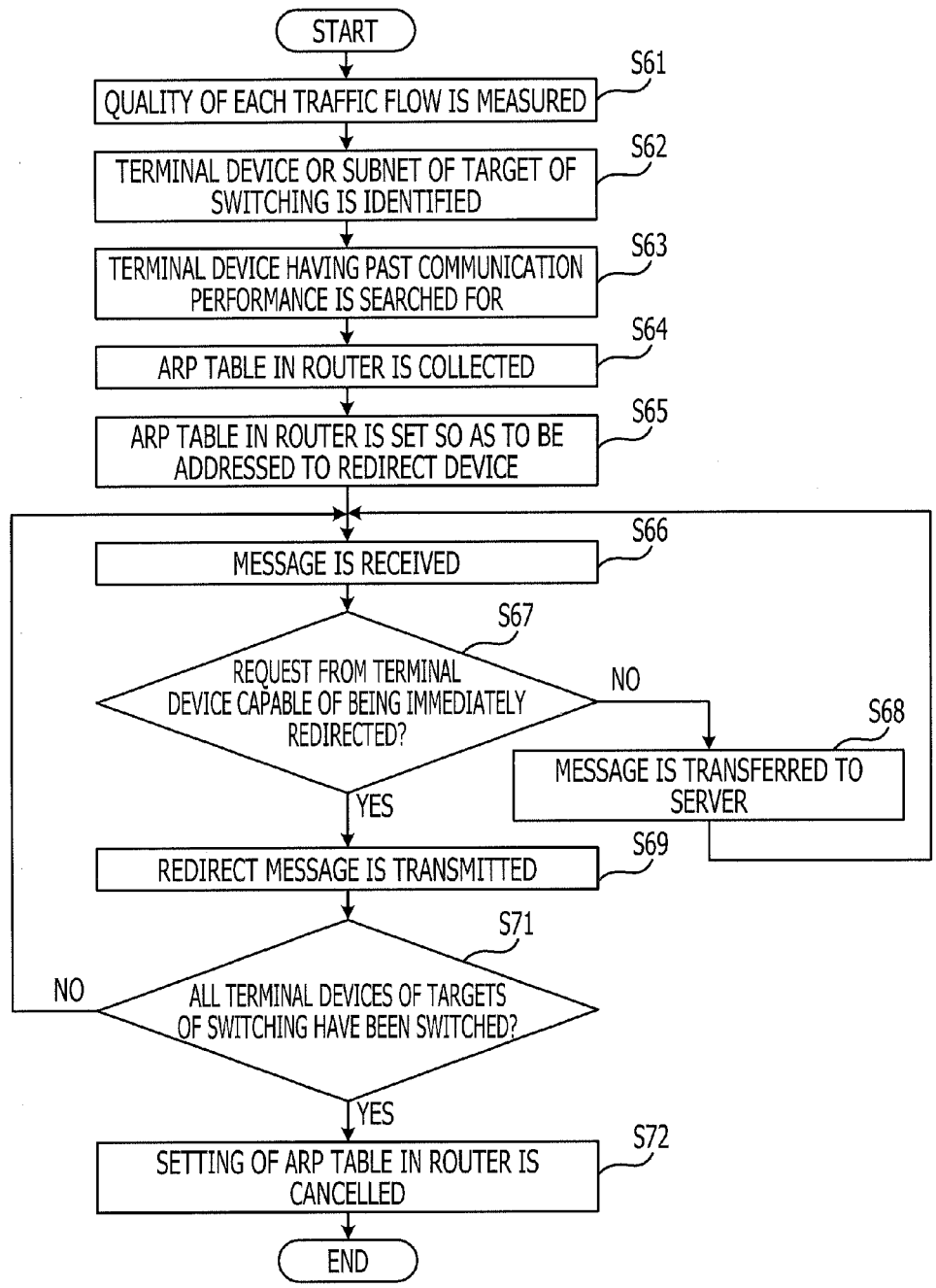
FIG. 23 is a flowchart illustrating an example of a procedure of redirect processing performed in a fourth embodiment.

FIG. 23 is a flowchart illustrating an example of the procedure of redirect processing performed in the fourth embodiment. Hereinafter, processing illustrated in FIG. 23 will be described along step numbers. In addition, processing operations in S61 to S64 and S67 to S71 illustrated in FIG. 23 are the same as the processing operations in S41 to S44 and S47 to S51 in the flowchart of the third embodiment illustrated in FIG. 20, respectively. Hereinafter, S65, S66, and S72 will be described where processing operations are different from the flowchart in FIG. 20.

[S65] The switching control unit 141 sets the ARP table 26a in the router 26. For example, the switching control unit 141 changes, to the MAC address of the redirect device 100, a MAC address in the entry of the IP address of the server 300, registered in the ARP table 26a within the router 26.

[S66] The switching control unit 141 receives a message whose destination is the server 300 and which has been transferred owing to the setting of the ARP table 26a in the router 26. In the same way as the processing in S46 in the third embodiment illustrated in FIG. 20, it is also possible for the switching control unit 141 to receive a message indicated by a packet captured in the capture unit 110.

[S72] The switching control unit 141 transmits an instruction for cancelling the setting of the ARP table 26a in the router 26, performed in S65 (for example, an instruction for returning to the MAC address of the server 300).

In this way, using the ARP table 26a in the router 26, it is possible to block a request message from a terminal device of a target of switching from being sent to the server 300. In addition, it is possible for the redirect device 100 to respond with a redirect message, in reply to the request message.

Figure 24:
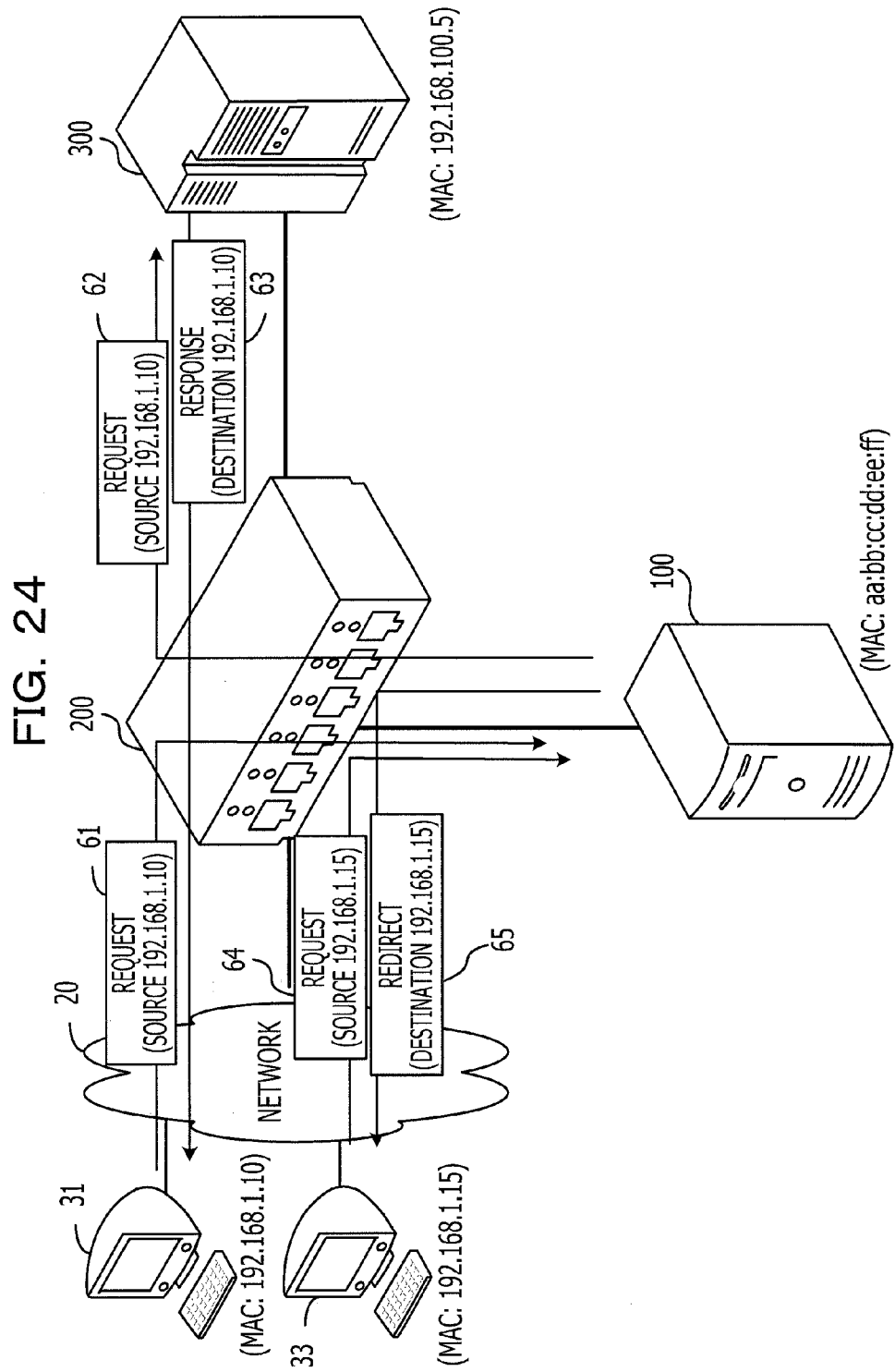
FIG. 24 is a diagram illustrating an example of redirect control performed in the fourth embodiment.

FIG. 24 is a diagram illustrating an example of redirect control performed in the fourth embodiment. The example in FIG. 24 illustrates the flows of messages when request messages 61 and 64 are transmitted from the terminal devices 31 and 33, respectively. It is assumed that the whole subnet of "192.168.1.0/24" is a target of switching. As illustrated in the ARP table 26a in FIG. 22, it is assumed that, while the terminal device 31 whose IP address is "102.168.1.10" is in a state of establishing communication, the terminal device 33 whose IP address is "102.168.1.15" is in a state of establishing no communication.

The request message 61 transmitted from the terminal device 31 in a state of establishing communication is transferred to the redirect device 100, in the switch 200. Since the terminal device 31 is in a state of establishing communication, the redirect device 100 that has received the request message 61 transmits, to the server 300, a request message 62 whose content is the same as the request message 61. The server 300 that has received the request message 62 executes processing in accordance with the content of the request message 62, and outputs a response message 63 using a packet whose destination is the IP address of the terminal device 31. The response message 63 is transferred to the router 26 through the switch 200. In addition, the response message 63 is transferred to the terminal device 31 through the network 20.

While not illustrated in FIG. 24, when a request message addressed to the server 300 has been transmitted from a terminal device outside the scope of a target of switching, the same processing as when a request message has been transmitted from the terminal device 31 is performed, and a response message is sent to the terminal device in reply.

The request message 64 transmitted from the terminal device 33 in a state of establishing no communication is transferred to the redirect device 100, in the switch 200.

In the redirect device 100 that has received the request message 64, a redirect message 65 addressed to the terminal device 33 is generated by the switching control unit 141, and the redirect message 65 is output through the transmission and reception unit 150. The redirect message 65 is transferred to the router 26, in the switch 200. In addition, the redirect message 65 is transferred to the terminal device 33 through the network 20.

For example, the redirect message 65 includes a redirect instruction that designates the IP address of the server 300*a* within the data center B different from the data center A in which the server 300 is installed. Therefore, in accordance with the instruction for redirect, the terminal device 33 that has received the redirect message 65 newly transmits a request message to the server 300*a*. Accordingly, it is possible for the terminal device 33 to receive the provision of service from the server 300*a*.

In this way, it is possible to switch the transmission destination of a request message from a terminal device to another server without influencing existing communication. Namely, it is possible to transmit a redirect message to a terminal device capable of being immediately redirected and guide an access destination to another server, without influencing the communication of a terminal device other than the terminal device capable of being immediately redirected.

Next, a fifth embodiment will be described. In the fifth embodiment, using a method for blocking a response message from a server owing to control performed by a redirect device, advance verification before the operation of a server of a test target is conducted.

Figure 25:
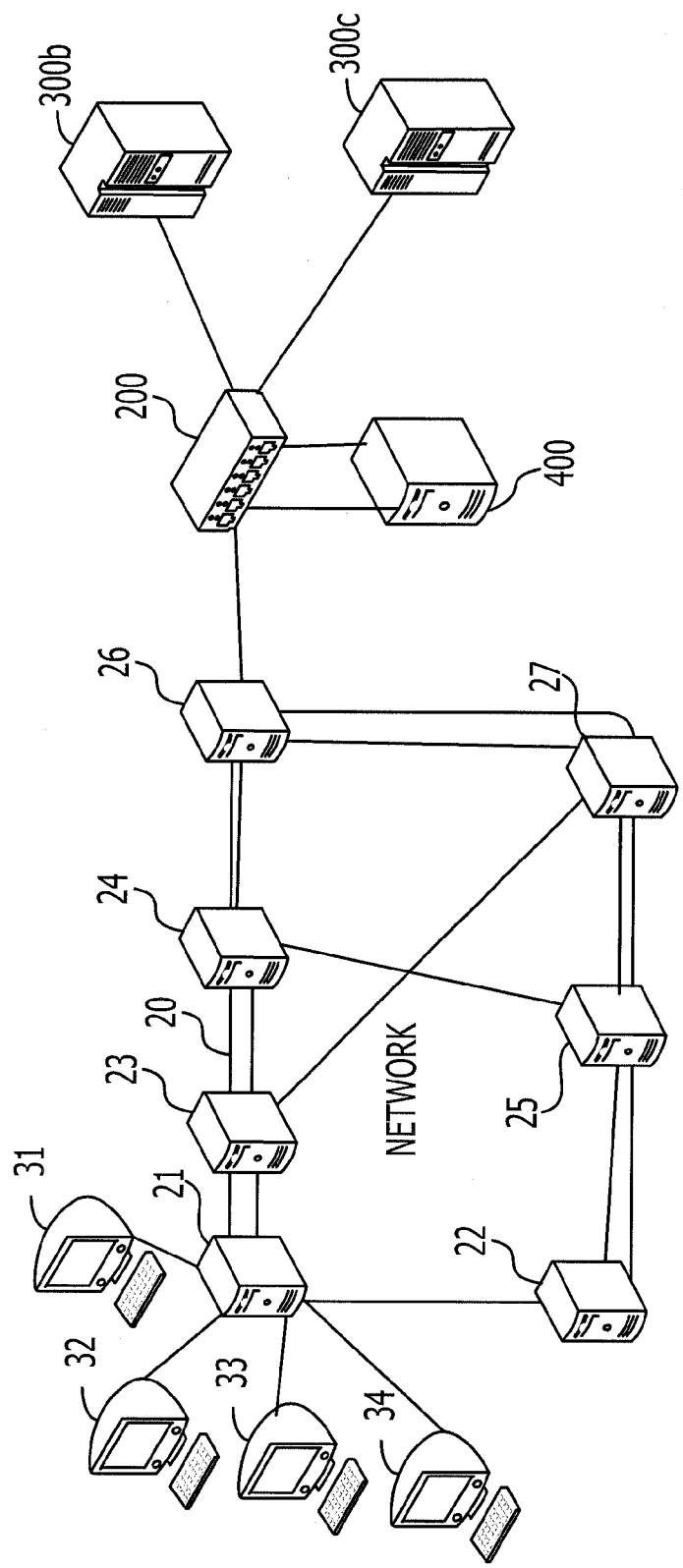
FIG. 25 is a diagram illustrating an example of a system configuration of a fifth embodiment.

FIG. 25 is a diagram illustrating an example of the system configuration of the fifth embodiment. In FIG. 25, the same symbol as that in FIG. 4 is assigned to the same element as that in the second embodiment illustrated in FIG. 4, and the description thereof will be omitted.

In the fifth embodiment, in place of the redirect device 100 in the second embodiment, a test device 400 is connected to the switch 200. The test device 400 is connected to both of a mirror port and a normal communication port of the switch 200. An operation server 300*b* and a test target server 300*c* are connected to the switch 200.

The operation server 300*b* is a computer providing service to the terminal devices 31 to 34 through the network 20. The test target server 300*c* is a computer to be a target of a test for testing whether or not the server 300*c* has the same processing function as the operation server 300*b*. For example, a computer prepared for being substituted for the operation server 300*b* is connected to the switch 200, as the test target server 300*c*.

The test device 400 is a computer conducting an operation test and a performance test for the test target server 300*c*. For example, from the mirror port of the switch 200, the test device 400 captures a message communicated between the terminal devices 31 to 34 and the operation server 300*b*. The test device 400 stores therein an acquired message flow as a communication history.

After that, the test device 400 operates the ACL 240 in the switch 200, and performs control so that response messages from the test target server 300*c* are not transferred to the terminal devices 31 to 34. Next, using the stored communication history, the test device 400 performs the operation test for the test target server 300*c*.

In addition, it is possible to realize the test device 400 and the operation servers 300*b* and 300*c*, using the same hardware configuration as the redirect device 100 illustrated in FIG. 5.

Figure 26:
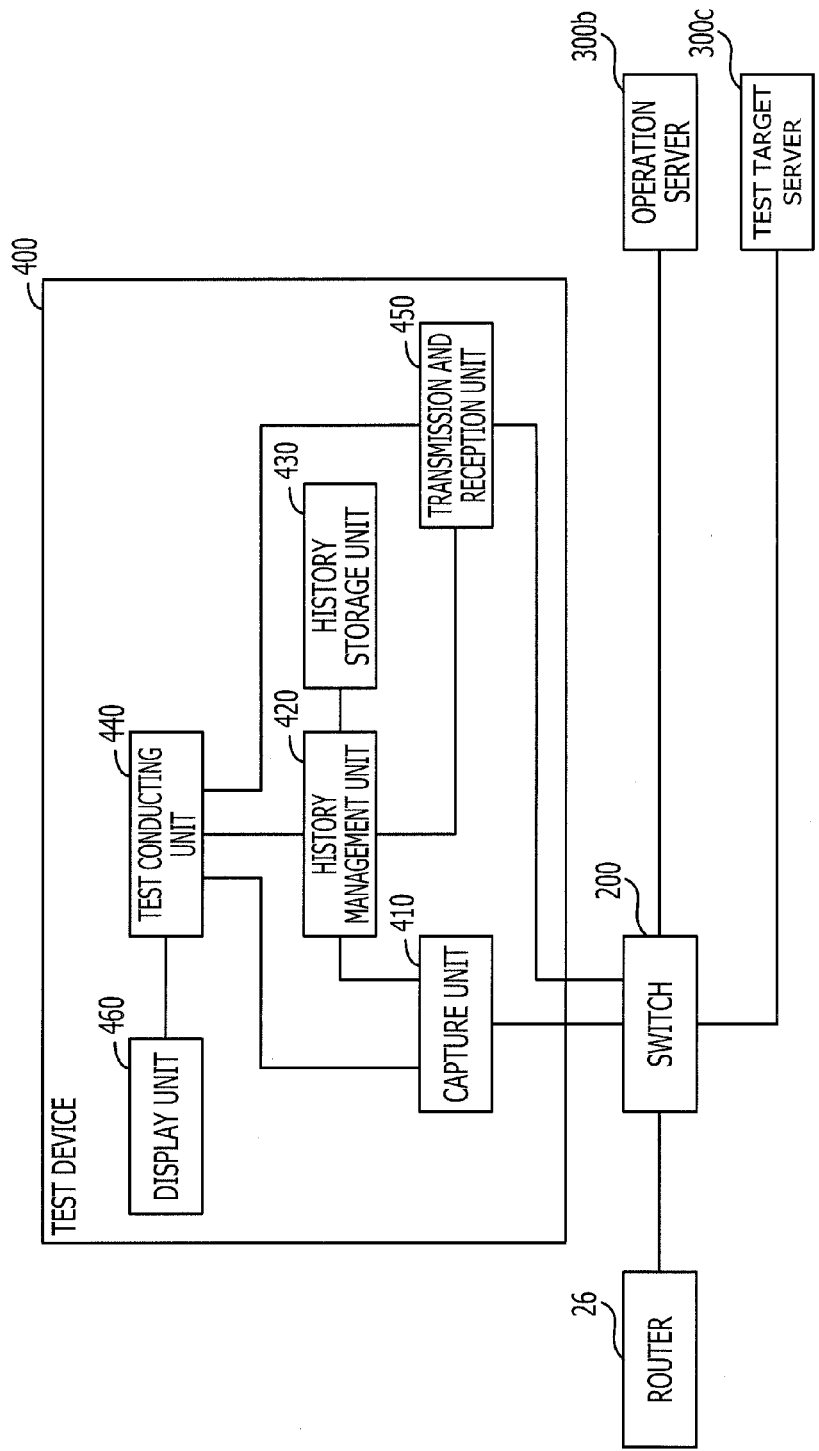
FIG. 26 is a block diagram illustrating an example of a function of a test device in the fifth embodiment.

FIG. 26 is a block diagram illustrating an example of the function of a test device in the fifth embodiment. The test device 400 includes a capture unit 410, a history management unit 420, a history storage unit 430, a test conducting unit 440, a transmission and reception unit 450, and a display unit 460.

The capture unit 410 captures a packet output from the mirror port of the switch 200.

The history management unit 420 stores, in the history storage unit 430, the communication history of a message recognizable on the basis of the packet captured in the capture unit 410. For example, the history management unit 420 stores, in the history storage unit 430, the communication history of a message communicated between the terminal devices 31 to 34 and the operation server 300*b*. The history management unit 420 stores, in the history storage unit 430, the communication history of a message communicated between the test conducting unit 440 and the test target server 300*c*.

The history storage unit 430 stores therein the communication history. For example, a portion of the storage area of a RAM or an HDD within the test device 400 is used as the history storage unit 430.

The test conducting unit 440 acquires the communication history stored in the history storage unit 430 through the history management unit 420, and conducts the operation test for the test target server 300*c* using the acquired communication history. For example, the test conducting unit 440 transmits, to the test target server 300*c* through the transmission and reception unit 450, the same request message as a request message sent from among the terminal devices 31 to 34 to the operation server 300*b*. The IP address of the transmission source of a request message transmitted at this time is the IP address of one of the terminal devices 31 to 34. The test conducting unit 440 acquires a response message from the test target server 300*c* through the capture unit 410. In addition, the test conducting unit 440 compares the communication history between the terminal devices 31 to 34 and the operation server 300*b* with the communication history between the test device 400 and the test target server 300*c*, and verifies that the test target server 300c operates in the same way as the operation server 300b.

The transmission and reception unit 450 transmits a request message to the test target server 300c through the switch 200.

The display unit 460 displays a test result due to the test conducting unit 440 on a monitor or the like.

Owing to the test device 400 having such a function as described above, the operation test for the test target server 300c is conducted. In the switch 200, as an initial state, a setting is performed so that the duplicate copy of an input/output packet in a communication port to which the operation server 300b is connected is output from the mirror port.

Figure 27:
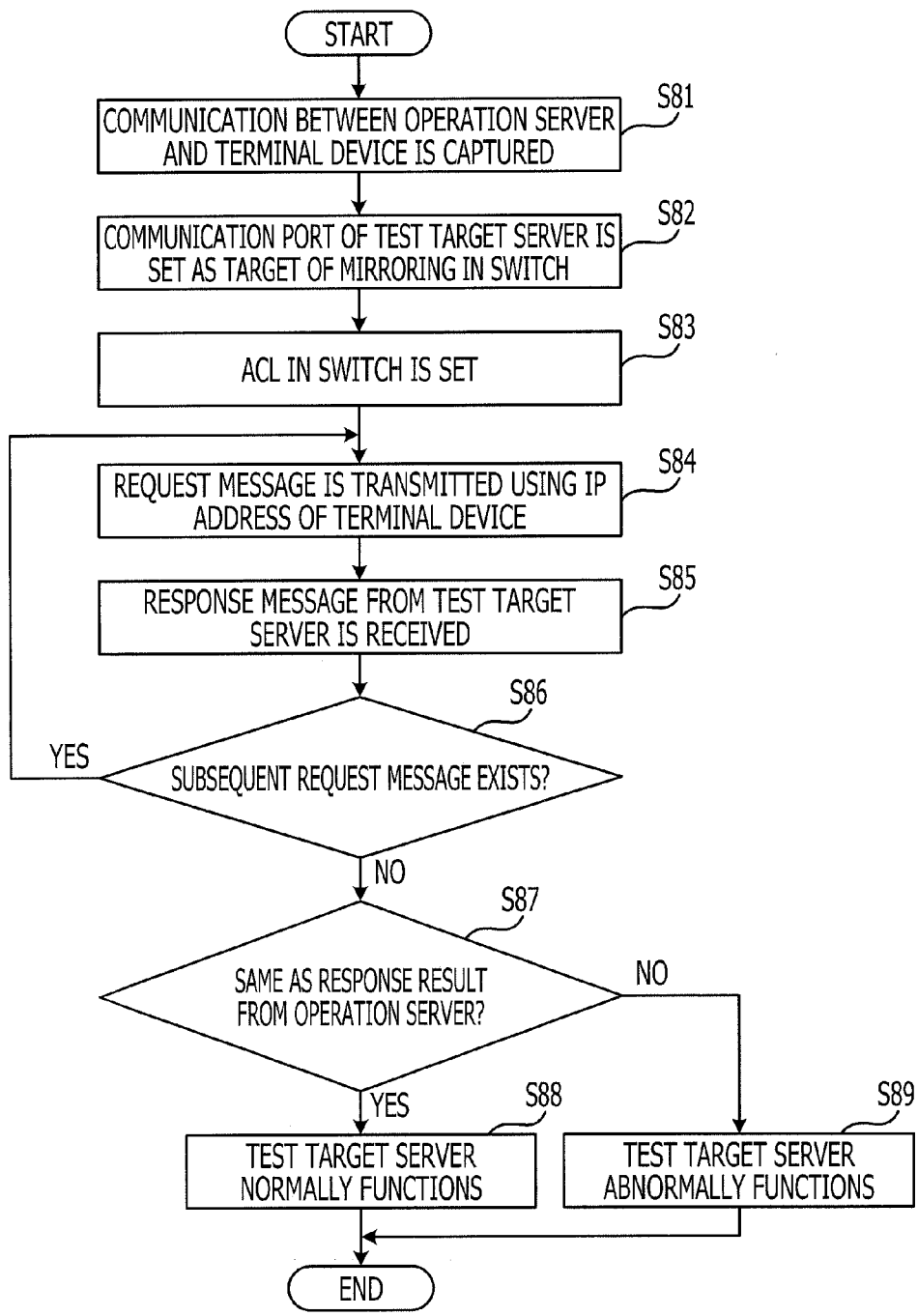
FIG. 27 is a flowchart illustrating a procedure of a test.

FIG. 27 is a flowchart illustrating the procedure of a test. Hereinafter, processing illustrated in FIG. 27 will be described along step numbers. For example, the following processing is executed when the input of an instruction for starting a test is performed by a person in charge of a test.

[S81] The capture unit 410 captures a packet communicated between the operation server 300b and each of the terminal devices 31 to 34. The capture unit 410 provides the captured packet to the history management unit 420. The history management unit 420 generates a communicated message by analyzing, for example, the acquired packet, and stores the generated message in the history storage unit 430.

[S82] When the time period of the capture processing in S81 has gotten to a given time period, the test conducting unit 440 sets the communication port to which the test target server 300c is connected, as the target of mirroring in the switch 200.

[S83] The test conducting unit 440 performs the setting of the ACL in the switch 200. For example, the test conducting unit 440 configures a setting for the ACL in the switch 200, which causes a packet, from among input packets from the communication port to which the test target server 300c is connected, to be blocked, the destination of the packet being the subnet of "192.168.1.0/24" to which the terminal devices 31 to 34 belong. Accordingly, response messages sent from the test target server 300c and addressed to the terminal devices 31 to 34 are blocked by the switch 200.

[S84] The test conducting unit 440 extracts one by one request messages within the history storage unit 430, which have not been extracted and whose destinations are the operation server 300b, in the chronological order of an acquisition time. In addition, the test conducting unit 440 transmits, to the test target server 300c, request messages whose contents are the same as the extracted request messages where the IP addresses of the terminal devices 31 to 34 are the addresses of transmission sources.

[S85] The history management unit 420 receives a response message from the test target server through the capture unit 410. In addition, the history management unit 420 stores the received response message in the history storage unit 430.

[S86] The test conducting unit 440 determines whether or not a request message, which has not been extracted and whose destination is the operation server 300b, remains within the history storage unit 430. If the corresponding request message exists, the test conducting unit 440 causes the processing to proceed to S84. If the corresponding request message does not exist, the test conducting unit 440 causes the processing to proceed to S87.

[S87] The test conducting unit 440 determines whether or not the content of a response message with which the operation server 300b has responded in reply to a transmitted request message is the same as that of the response message received in S85. When the contents of the response messages are equal to each other, the test conducting unit 440 causes the processing to proceed to S88. When the contents of the response messages are different from each other, the test conducting unit 440 causes the processing to proceed to S89.

[S88] The test conducting unit 440 determines that the test target server 300c normally functions. For example, through the display unit 460, the test conducting unit 440 causes a monitor to display that the test target server 300c normally functions. After that, the processing is terminated.

[S89] The test conducting unit 440 determines that the test target server 300c abnormally functions. For example, through the display unit 460, the test conducting unit 440 causes a monitor to display that the test target server 300c abnormally functions. After that, the processing is terminated.

In this way, the operation test for the test target server 300c is performed.

Figure 28:
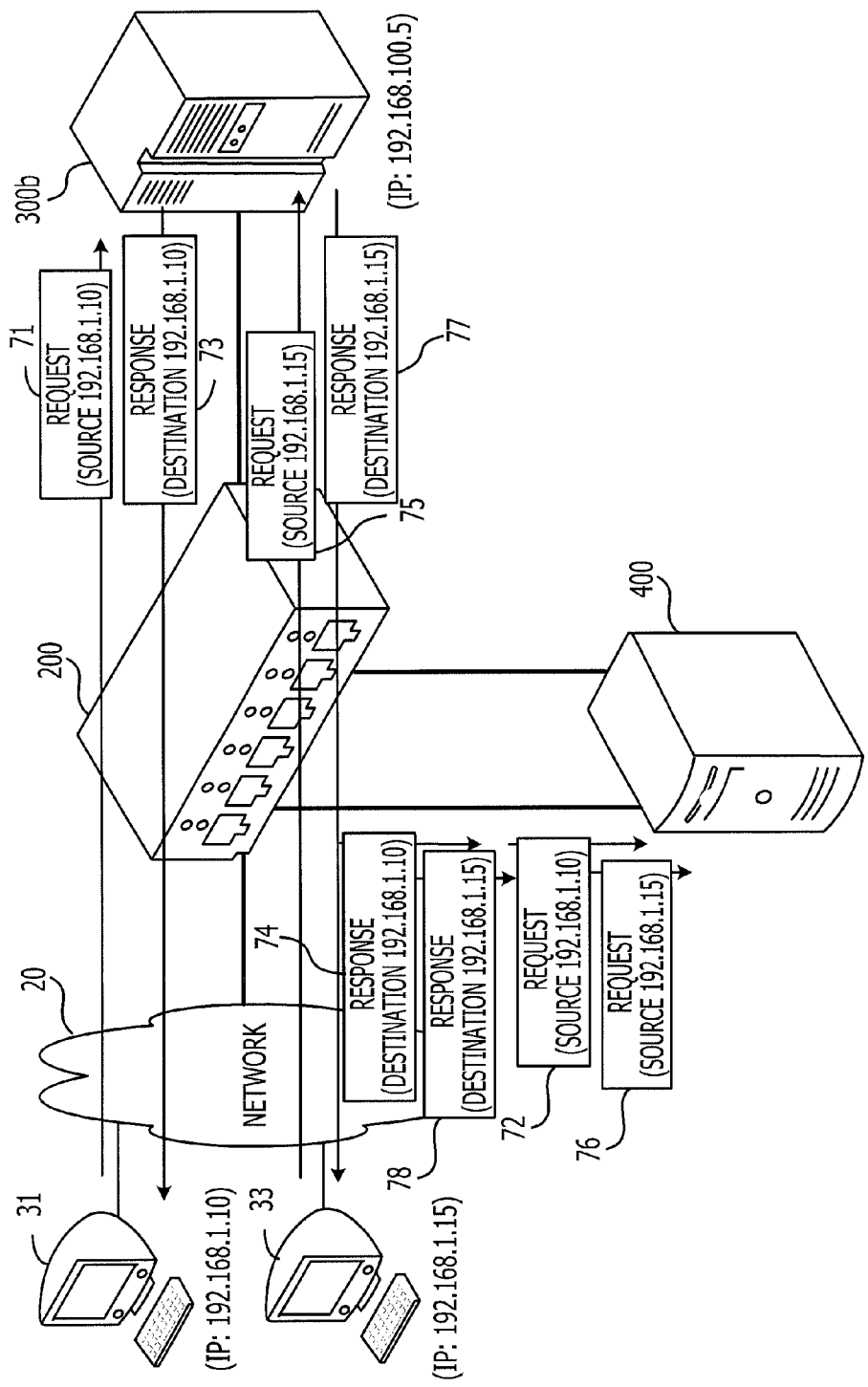
FIG. 28 is a diagram illustrating an example of an acquisition status of a communication history.

FIG. 28 is a diagram illustrating an example of the acquisition status of a communication history. When a request message 71 has been transmitted from the terminal device 31 to the operation server 300b, the request message 71 is duplicated in the switch 200. In addition, a duplicate request message 72 is output and input from the mirror port of the switch 200 to the test device 400. In the operation server 300b, processing corresponding to the request message 71 is executed, and a response message 73 addressed to the terminal device 31 is transmitted. Then, the response message 73 is duplicated in the switch 200. In addition, a duplicate response message 74 is output and input from the mirror port of the switch 200 to the test device 400.

In the same way, when a request message 75 has been transmitted from the terminal device 33 to the operation server 300b, the request message 75 is duplicated in the switch 200. In addition, a duplicate request message 76 is output and input from the mirror port of the switch 200 to the test device 400. In the operation server 300b, processing corresponding to the request message 75 is executed, and a response message 77 addressed to the terminal device 33 is transmitted. Then, the response message 77 is duplicated in the switch 200. In addition, a duplicate response message 78 is output and input from the mirror port of the switch 200 to the test device 400.

In the test device 400, the duplicate request messages 72 and 76 and the duplicate response messages 74 and 78, received from the switch 200, are stored as history information.

Figure 29:
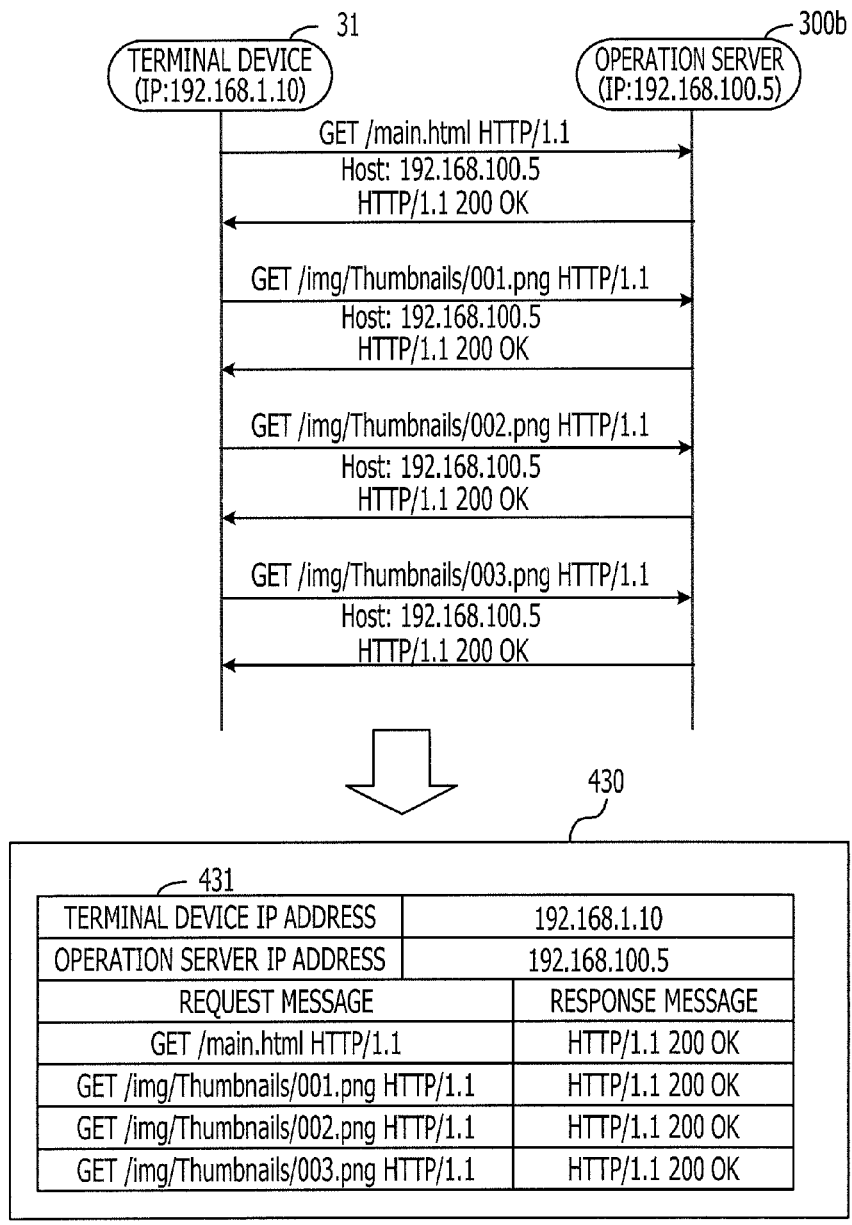
FIG. 29 is a diagram illustrating an example of an acquired communication history.

FIG. 29 is a diagram illustrating an example of an acquired communication history. FIG. 29 illustrates an example of a communication history 431 between the terminal device 31 and the operation server 300b. For example, in the communication history 431, the lists of pairs of request messages and response messages are registered in chronological order with being associated with a pair of the IP address of a terminal device and the IP address of an operation server.

After such a communication history 431 has been acquired, the test device 400 switches the target of mirroring for a mirror port to a packet input to the communication port to which the test target server 300c is connected. The test device 400 operates the ACL in the switch 200.

Figure 30:
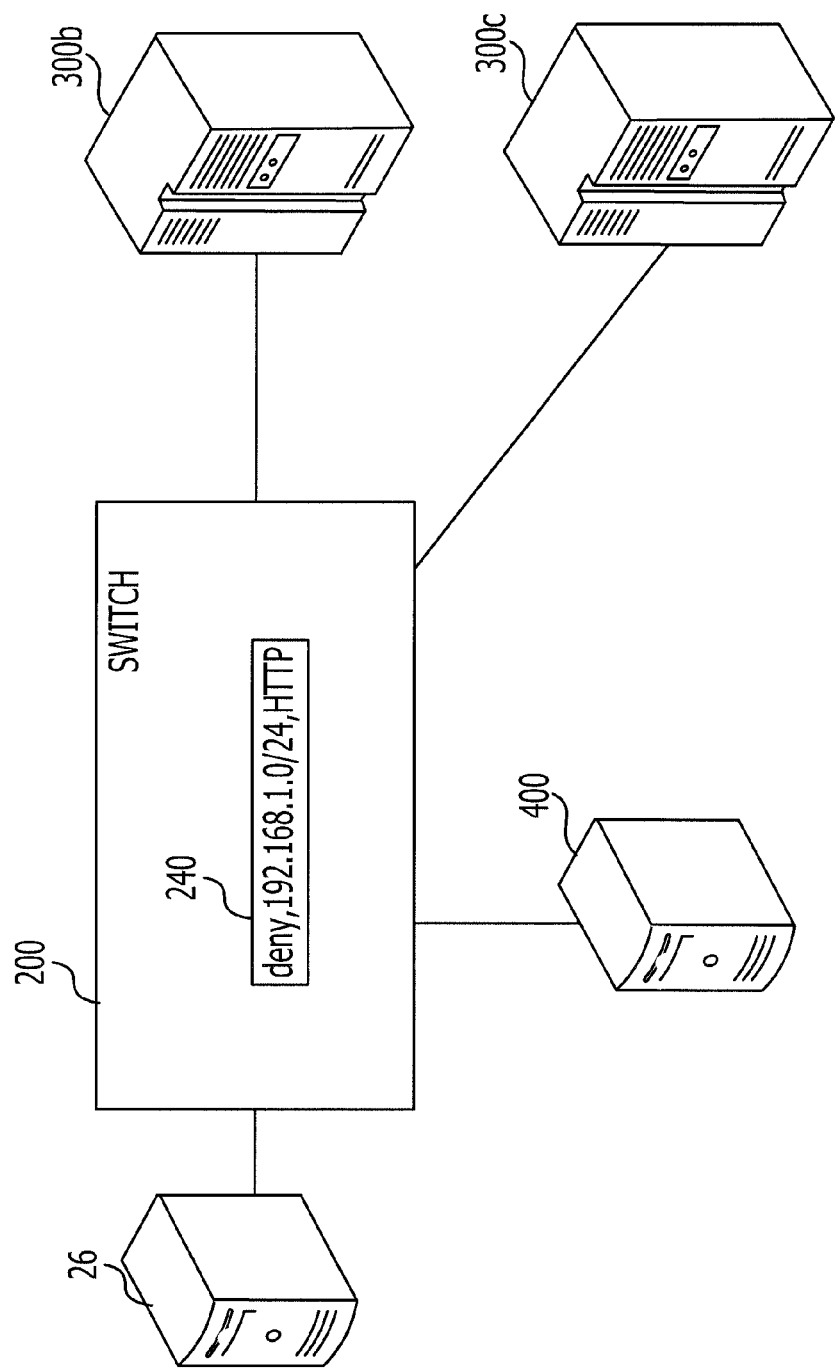
FIG. 30 is a diagram illustrating an example of an ACL operation of a switch.

FIG. 30 is a diagram illustrating an example of the ACL operation of a switch. For example, the test conducting unit 440 in the test device 400 sets "deny,192.168.1.0/24,HTTP" in the ACL 240 in the switch 200. Accordingly, a packet, sent from the test target server 300c and addressed to a terminal device within the subnet of "192.168.1.0/24", is blocked in the switch 200.

After that, the test conducting unit 440 transmits a request message for testing, to the test target server 300c.

Figure 31:
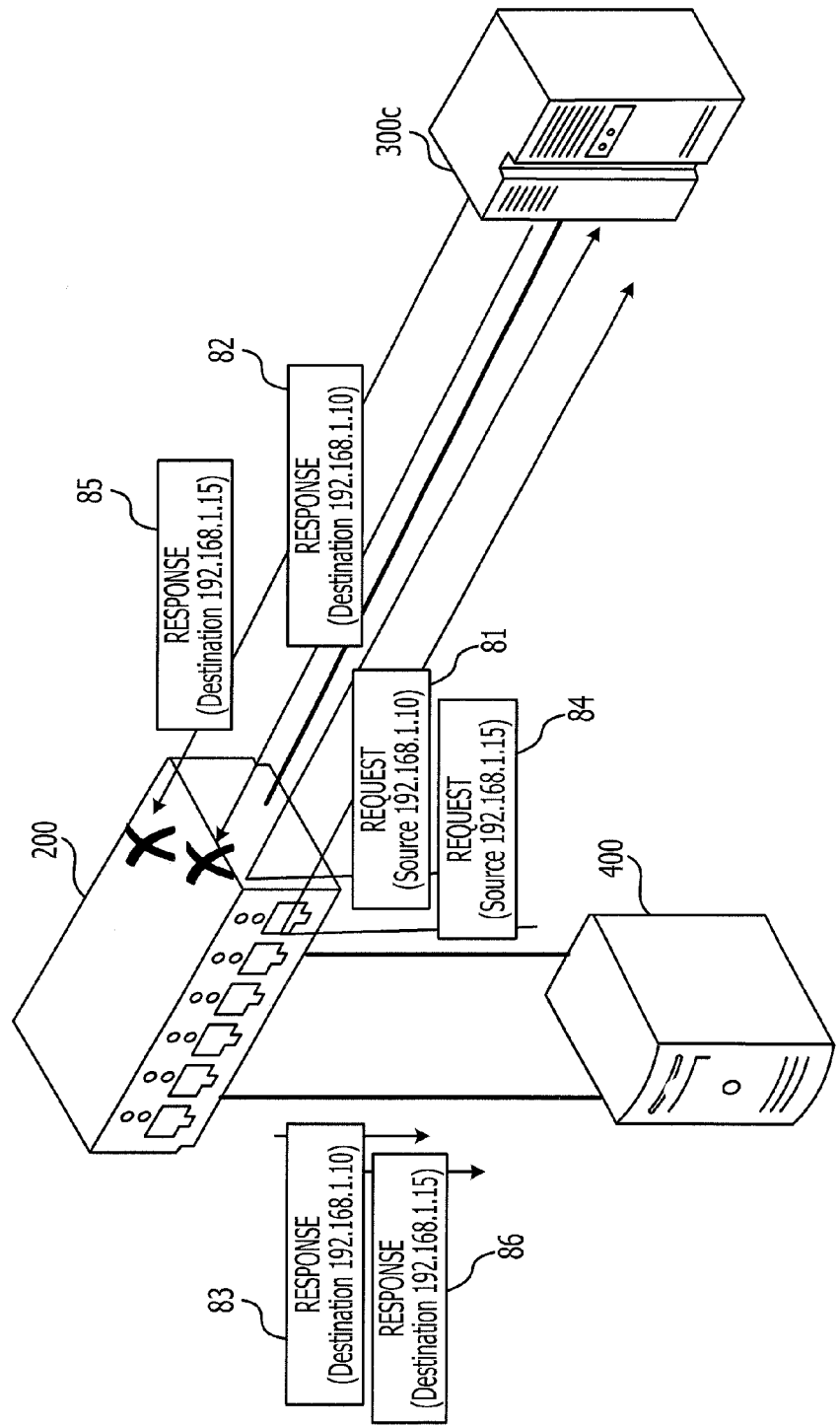
FIG. 31 is a diagram illustrating an example of a transmission/reception status of a message at the time of a test.

FIG. 31 is a diagram illustrating an example of the transmission/reception status of a message at the time of a test. For example, a request message 81 whose transmission source is the IP address of the terminal device 31 is transmitted from the test device 400 to the test target server 300c. The request message 81 is transferred to the test target server 300c by the switch 200. In the test target server 300c, processing corresponding to the request message 81 is executed, and a response message 82 addressed to the terminal device 31 is transmitted. The response message 82 is blocked in the switch 200, and the response message 82 is duplicated in the switch 200. In addition, a duplicate response message 83 is output and input from the mirror port of the switch 200 to the test device 400.

In the same way, a request message 84 whose transmission source is the IP address of the terminal device 33 is transmitted from the test device 400 to the test target server 300c. The request message 84 is transferred to the test target server 300c by the switch 200. In the test target server 300c, processing corresponding to the request message 84 is executed, and a response message 85 addressed to the terminal device 33 is transmitted. The response message 85 is blocked in the switch 200, and the response message 85 is duplicated in the switch 200. In addition, a duplicate response message 86 is output and input from the mirror port of the switch 200 to the test device 400.

In the test device 400, the response messages 83 and 86 acquired in such a way as described above are combined with, for example, the corresponding request messages 81 and 84, and stored, as history information at the time of a test, in the history storage unit 430. In addition, by comparing history information at the time of an operation with the history information at the time of a test, it is verified whether or not the test target server 300c normally functions.

FIG. 32 is a diagram illustrating an example of communication when a test target server correctly functions. FIG. 32 illustrates an example of a communication history 432 between the test device 400 and the test target server 300c. For example, in the communication history 432, communicated messages are registered with being associated with a pair of the IP address of a terminal device set, as the transmission source of a request message, by the test device 400 and the IP address of the test target server 300c. For example, in the communication history 432, the lists of pairs of request messages and response messages are registered in chronological order.

In the communication history 432 illustrated in FIG. 32, the same response message as a response message transmitted from the operation server 300b to the terminal device 31 is transmitted from the test target server 300c. Accordingly, the test conducting unit 440 determines that the test target server 300c normally functions.

FIG. 33 is a diagram illustrating an example of communication when a test target server does not correctly function. FIG. 33 illustrates an example of a communication history 433 between the test device 400 and the test target server 300c. In the communication history 433 illustrated in FIG. 33, a response message partially different from a response message transmitted from the operation server 300b to the terminal device 31 is transmitted from the test target server 300c. Accordingly, the test conducting unit 440 determines that the test target server 300c does not normally function.

In such a way as described above, it is possible to verify in advance whether a server intended to be introduced correctly functions.

While, in the second to fifth embodiments, using the mirror port of the switch 200, the capture of a packet is performed, it is also possible to capture a packet using a hub (multi-port repeater) including no switch function. In the hub including no switch function, a packet input to one communication port is output from all the other communication ports. Therefore, by connecting the redirect device 100 or the test device 400 to an arbitrary communication port of a hub installed on a communication path between a terminal device and a server, it is possible to capture a packet transmitted or received through the hub.

While, in the fifth embodiment, owing to the setting of the ACL 240 in the switch 200, the communication of a response message from the test target server 300c to the terminal device is blocked, it is also possible to block communication using another method. For example, a response message to a terminal device may also be caused to be transferred to the test device 400, by operating the ARP table 310 in the test target server 300c in the same way as in the second embodiment.

It is possible to realize the processing function illustrated in each of the above-mentioned embodiments, using a computer. In that case, a program is provided in which the content of processing of functions included in the redirect device 100 and the test device 400 is described. By executing that program in the computer, the above-mentioned processing functions are realized on the computer. It may be possible to record, in a computer-readable recording medium, the program describing the content of processing. Examples of the computer-readable recording medium include a magnetic storage device, an optical disk, a magneto-optical recording medium, a semiconductor memory, and the like. Examples of the magnetic storage device include a hard disk device (HDD), a flexible disk (FD), a magnetic tape, and the like. Examples of the optical disk include a DVD, a DVD-RAM, a CD-ROM/RW, and the like. Examples of the magneto-optical recording medium include a Magneto-Optical disc (MO) and the like.

When the program is distributed, portable recording media such as a DVD, a CD-ROM, and the like, in which that program is recorded, are on sale, for example. The program may also be stored in the storage device of a server computer, and the program may also be transferred from the server computer to another computer through a network.

For example, the computer executing a program stores, in the self-storage device, the program recorded in a portable recording medium or the program transferred from the server computer. In addition, the computer reads the program from the self-storage device, and executes processing according to the program. In addition, the computer may also directly read the program from the portable recording medium and execute processing according to the program. Every time a program is transferred from the server computer, the computer may also sequentially execute processing according to the received program.

It is also possible to realize at least a portion of the above-mentioned processing functions using an electronic circuit such as a digital signal processor (DSP), an application specific integrated circuit (ASIC), a programmable logic device (PLD), or the like.

While the embodiments have been exemplified in such a way as described above, the configuration of each unit illustrated in the embodiments may be replaced with another unit including the same function. In addition, another arbitrary component or process may also be added. Furthermore, two or more arbitrary configurations (features) from among the above-mentioned embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and configured to execute a process including:
   blocking, owing to remote control through a network, at least one of communication of a request transmitted from a network device disposed on a communication path between a first device and a second device to the second device, the request being transmitted by the first device and addressed to the second device, and communication of a response transmitted by the second device and addressed to the first device;
   acquiring, from the network device, a copy of the request transmitted by the first device and addressed to the second device, after a communication between the network device and the second device is blocked by the processor;
   transmitting to the first device via the network device, an instruction for switching a transmission destination of the request from the second device to a third device, the third device being coupled to the first device by a communication path on which the network device is not disposed;
   receiving a plurality of packets via the network device;
   extracting a transmission source Internet Protocol (IP) address and a destination IP address from each of the plurality of packets and generating a pair of IP addresses;
   generating a plurality of traffic flows by arranging packets having an identical IP address in chronological order;
   counting a total number of lost packets for each of the plurality of traffic flows;
   determining a normality of communication quality for each of the plurality of traffic flows based on the counted total number of lost packets; and
   identifying a device as the first device, the device being related to a traffic flow with a communication quality determined to be poor based on a result of the determining.

2. The information processing device according to claim 1, wherein
   the blocking includes blocking at least one of the communication of the request and the communication of the response after a given time period or more has elapsed from a time when final communication was established between the first device and the second device.

3. The information processing device according to claim 2, wherein the process further includes:
   acquiring, from the second device and in a storage unit, a table where an address of a communication partner with which communication has been established within the given time period is registered, and
   the blocking includes determining that the given time period or more has elapsed from the time when an address of the first device is not registered in the table.

4. The information processing device according to claim 1, wherein the blocking of the response includes blocking, to the second device, by transmitting an instruction for registering a destination address different from an address of a device on the communication path between the first device and the second device, the destination address being a destination address of a frame in a data link layer when a packet addressed to the second device is transmitted.

5. The information processing device according to claim 4, wherein blocking of the response includes:
   blocking, to the second device, by transmitting a registration instruction for instructing to register an address of the information processing device; and
   discarding a packet transmitted from the second device and addressed to the first device.

6. The information processing device according to claim 1, wherein the transmitting includes:
   transmitting the instruction to the first device when a given time period or more has elapsed from a time when last communication was established between the first device and the second device; and
   transmitting, to the network device, an instruction for cancelling blocking of communication transmitted by the first device and addressed to the second device after the switching instruction has been transmitted to the first device.

7. The information processing device according to claim 1, wherein
   the blocking of the request includes blocking, to a router connected in a same segment as the second device, by transmitting an instruction for registering a destination address different from an address of a device on the communication path between the first device and the second device, the destination address being a destination address of a frame in a data link layer when a packet addressed to the second device is transmitted.

8. The information processing device according to claim 7, wherein the blocking of the request includes:
   blocking, to the router, by transmitting a registration instruction for instructing to register a destination address of the information processing device, as the destination address being a destination address of a frame in a data link layer when a packet addressed to the second device is transmitted;
   transferring, to the second device, a packet from a device other than the first device, from among packets sent from the router and addressed to the second device; and
   discarding a packet from the first device.

9. The information processing device according to claim 7, wherein the process further includes:
   after a switching instruction has been transmitted to the first device, transmitting, to the router, an instruction for cancelling setting of a destination address of a frame in a data link layer when a packet addressed to the second device is transmitted.

10. The information processing device according to claim 1, wherein the process further includes: measuring communication quality between the second device and each of a plurality of devices transmitting requests to the second device; when the number of target devices where the communication quality is determined to be deteriorated based on results of the measuring is greater than or equal to a given number, the target devices being located within a same subnet, identifying all devices belonging to the subnet as candidates of the first device; and when the number of the target devices where the communication quality is less than the given number, determining the target devices as the first device.

11. The information processing device according to claim 10, wherein the process further includes:
   determining, as the first device, a device having a past communication performance with respect to the second device, from among all devices belonging to the subnet, when the all devices belonging to the subnet are identified as the first device.

12. The information processing device according to claim 1, wherein the counting includes examining a missing sequence number of a packet of the plurality of received packets.

13. The information processing device according to claim 1, wherein the determining includes:
   determining that communication quality is good when a ratio of lost packets to the plurality of received packets is less than a given value; and
   determining that communication quality is poor when the ratio is greater than or equal to the given value.

14. A non-transitory computer-readable recording medium storing a program that causes a processor to execute a process, the process comprising:
   blocking, owing to remote control through a network, at least one of communication of a request transmitted from a network device disposed on a communication path between a first device and a second device to the second device, the request being transmitted by the first device and addressed to the second device, and communication of a response transmitted by the second device and addressed to the first device;
   acquiring, from the network device, a copy of the request transmitted by the first device and addressed to the second device, after a communication between the network device and the second device is blocked by the processor;
   transmitting, to the first device via the network device, an instruction for switching a transmission destination of the request from the second device to a third device, the third device being coupled to the first device by a communication path on which the network device is not disposed;
   receiving a plurality of packets via the network device;
   extracting a transmission source Internet Protocol (IP) address and a destination IP address from each of the plurality of packets and generating a pair of IP addresses;
   generating a plurality of traffic flows by arranging packets having an identical IP address in chronological order;
   counting a total number of lost packets for each of the plurality of traffic flows;
   determining a normality of communication quality for each of the plurality of traffic flows based on the counted total number of lost packets; and
   identifying a device as the first device, the device being related to a traffic flow with a communication quality determined to be poor based on a result of the determining.

15. A control method executed by a processor in a computer, the control method comprising:
   blocking, owing to remote control through a network, at least one of communication of a request transmitted from a network device disposed on a communication path between a first device and a second device to the second device, the request being transmitted by the first device and addressed to the second device, and communication of a response transmitted by the second device and addressed to the first device;
   acquiring, from the network device, a copy of the request transmitted by the first device and addressed to the second device, after a communication between the network device and the second device is blocked by the processor:
   transmitting, to the first device via the network device, an instruction for switching a transmission destination of the request from the second device to a third device, the third device being coupled to the first device by a communication path on which the network device is not disposed;
   receiving a plurality of packets via the network device;
   extracting a transmission source Internet Protocol (IP) address and a destination IP address from each of the plurality of packets and generating a pair of IP addresses;
   generating a plurality of traffic flows by arranging packets having an identical IP address in chronological order;
   counting a total number of lost packets for each of the plurality of traffic flows;
   determining a normality of communication quality for each of the plurality of traffic flows based on the counted total number of lost packets; and
   identifying a device as the first device, the device being related to a traffic flow with a communication quality determined to be poor based on a result of the determining.

16. The control method according to claim 15, wherein the blocking includes blocking at least one of the communication of the request and the communication of the response after a given time period or more has elapsed from a time when final communication was established between the first device and the second device.

17. The control method according to claim 16, further comprising:
   acquiring, from the second device and in a storage unit, a table where an address of a communication partner with which communication has been established within the given time period is registered, and
   the blocking includes determining that the given time period or more has elapsed from the time when an address of the first device is not registered in the table.

18. The control method according to claim 15, wherein the blocking of the response includes blocking, to the second device, by transmitting an instruction for registering a destination address different from an address of a device on the communication path between the first device and the second device, the destination address being a destination address of a frame in a data link layer when a packet addressed to the second device is transmitted.

19. The control method according to claim 15, wherein the counting includes examining a missing sequence number of a packet of the plurality of received packets.

20. The control method according to claim 15, wherein the determining includes:
   determining that communication quality is good when a ratio of lost packets to the plurality of received packets is less than a given value; and
   determining that communication quality is poor when the ratio is greater than or equal to the given value.

* * * * *